(12) United States Patent
Centonza et al.

(10) Patent No.: US 10,880,948 B2
(45) Date of Patent: Dec. 29, 2020

(54) CORE NETWORK AWARENESS OF USER EQUIPMENT, UE, STATE

(71) Applicant: Telefonaktiebolagel LM Ericsson (publ), Stockholm (SE)

(72) Inventors: Angelo Centonza, Stockholm (SE); Gunnar Mildh, Sollentuna (SE); Lasse Olsson, Träslövsläge (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/338,021

(22) PCT Filed: Sep. 29, 2017

(86) PCT No.: PCT/IB2017/056040
§ 371 (c)(1),
(2) Date: Mar. 29, 2019

(87) PCT Pub. No.: WO2018/060968
PCT Pub. Date: Apr. 5, 2018

(65) Prior Publication Data
US 2019/0246445 A1 Aug. 8, 2019

Related U.S. Application Data

(60) Provisional application No. 62/402,073, filed on Sep. 30, 2016.

(51) Int. Cl.
*H04W 76/27* (2018.01)
*H04W 64/00* (2009.01)
*H04W 92/04* (2009.01)

(52) U.S. Cl.
CPC .......... *H04W 76/27* (2018.02); *H04W 64/00* (2013.01); *H04W 92/045* (2013.01)

(58) Field of Classification Search
None
See application file for complete search history.

(56) References Cited

U.S. PATENT DOCUMENTS 10,129,802 B2 * 11/2018 Pelletier ................ H04W 76/27
10,356,837 B2 * 7/2019 Chen .................... H04W 76/27
(Continued)

FOREIGN PATENT DOCUMENTS

| EP | 2 844 023 A1 | 3/2015 |
| RU | 2 496 275 C2 | 3/2010 |

(Continued)

OTHER PUBLICATIONS

Office Action issued for Application No. 2019112884 by the Russian Federation Electrical Engineering and Communications Department—dated Feb. 4, 2020.
(Continued)

*Primary Examiner* — Anh Vu H Ly
(74) *Attorney, Agent, or Firm* — Baker Botts, LLP

(57) ABSTRACT

According to some embodiments, a method for use in a network node of providing a radio resource control (RRC) state of a user equipment (UE) to a core network node comprises: receiving, from the core network node, a request to receive a notification of a transition of the UE between a first and second RRC state; determining the UE transitioned between the first and second RRC state; and sending the notification of the transition to the core network node. A method for use in a core network node of receiving RRC state information of a UE comprises: sending, to the network node, a subscription request to receive a notification of a transition of the UE between a first and second RRC state; and upon the network node determining the UE transitioned between the first and second RRC state, receiving the notification from the network node.

26 Claims, 13 Drawing Sheets

(56) References Cited

U.S. PATENT DOCUMENTS

| | | | |
|---|---|---|---|
| 2008/0320085 A1* | 12/2008 | Bouilloux-Lafont | ............... H04N 7/17318 709/206 |
| 2014/0057566 A1 | 2/2014 | Watfa et al. | |
| 2014/0192739 A1 | 7/2014 | Liao | |
| 2015/0146599 A1* | 5/2015 | Jha | .............. H04L 69/163 370/311 |
| 2015/0358954 A1* | 12/2015 | Koshimizu | .......... H04W 68/00 370/329 |
| 2016/0234877 A1* | 8/2016 | Bangolae | ............. H04W 76/27 |
| 2016/0309379 A1* | 10/2016 | Pelletier | ............. H04W 76/12 |
| 2017/0367058 A1* | 12/2017 | Pelletier | ............ H04W 56/0045 |
| 2018/0376407 A1* | 12/2018 | Myhre | ................. H04W 76/27 |
| 2019/0014515 A1* | 1/2019 | Zee | ...................... H04W 76/27 |
| 2019/0021130 A1* | 1/2019 | Kim | .................... H04W 72/042 |
| 2019/0028941 A1* | 1/2019 | Zee | ...................... H04W 36/32 |
| 2019/0166553 A1* | 5/2019 | Ryoo | ................ H04W 74/0833 |
| 2019/0174570 A1* | 6/2019 | Fujishiro | ............. H04W 76/27 |
| 2019/0191483 A1* | 6/2019 | Ryoo | .................... H04W 76/30 |
| 2019/0208568 A1* | 7/2019 | Dwyer | ................ H04W 76/27 |
| 2019/0215800 A1* | 7/2019 | Fujishiro | ............. H04W 68/00 |
| 2019/0239191 A1* | 8/2019 | Zee | ...................... H04W 68/04 |
| 2019/0274074 A1* | 9/2019 | Lee | ................. H04W 36/0055 |
| 2019/0320467 A1* | 10/2019 | Freda | ................ H04W 74/0833 |
| 2020/0037345 A1* | 1/2020 | Ryoo | .................... H04W 76/10 |

FOREIGN PATENT DOCUMENTS

| | | |
|---|---|---|
| RU | 2 578 666 C2 | 4/2012 |
| WO | 2011 100570 A1 | 8/2011 |
| WO | 2016 089349 A1 | 6/2016 |
| WO | 2016 130264 A1 | 8/2016 |

OTHER PUBLICATIONS

Search Report issued for Application No. 2019112884 by the Russian Federation Electrical Engineering and Communications Department—dated Feb. 4, 2020.

PCT International Search Report for International application No. PCT/IB2017/056040—dated Nov. 29, 2017.

PCT Written Opinion of the International Searching Authority for International application No. PCT/IB2017/056040—dated Nov. 29, 2017.

3GPP TSG-RAN WG2 95; Gothenburg, Sweden; Source: Samsung; Title: Energy efficiency enhancement in new RRC state of NR (R2-165904)—Aug. 22-26, 2016.

Office Action issued by the Japanese Patent Office for JP Patent Application No. 2019-517336—dated Mar. 30, 2020.

3GPP TSG RAN WG2 #89bis; Bratislava, Slovakia; Source: Qualcomm Incorporated; Title: Considerations on enhanced RRC state transition (R2-151183)—Apr. 20-24, 2015.

3GPP TSG-RAN WG3 #91bis; Bangalore, India; Change Request; Title: Introduction of the CIOT Indication; Source to WG: Samsung; Source to TSG: R3 (R3-160987)—Apr. 11-15, 2016.

Canadian Patent Office, Office Action, Application No. 3,037,476, PCT No. IB2017056040, dated Apr. 29, 2020.

Russian Patent Office, Decision on Grant, Application No. 2420-555848RU, 2019112884/07(024947), dated Apr. 29, 2020.

* cited by examiner

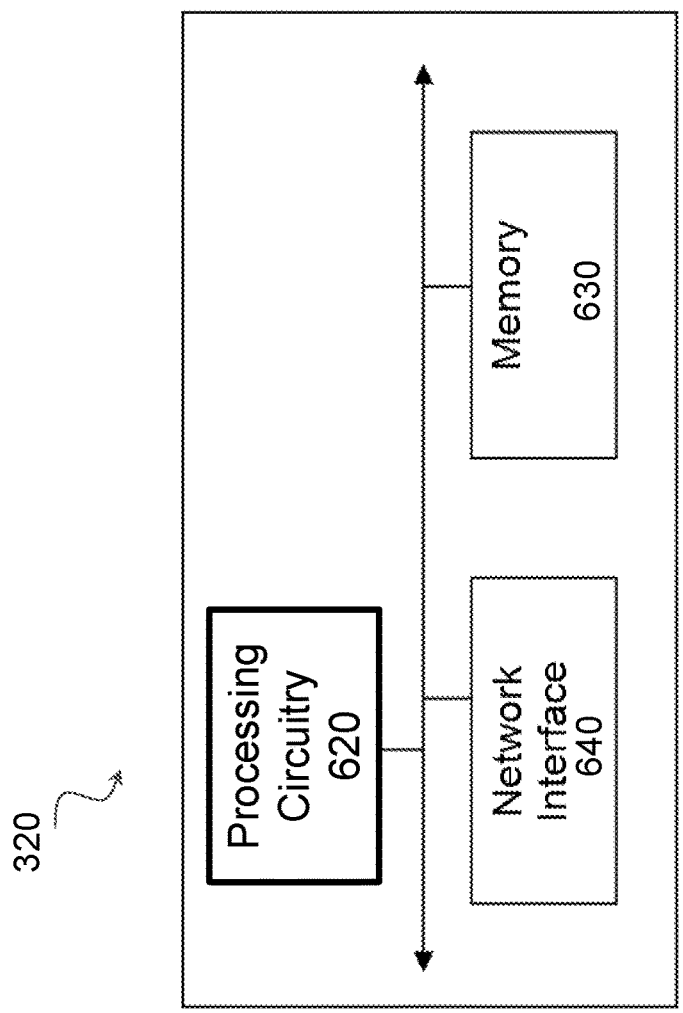
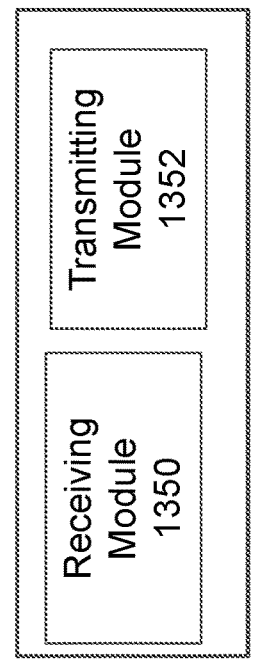
FIG. 13A
FIG. 13B

CORE NETWORK AWARENESS OF USER EQUIPMENT, UE, STATE

PRIORITY

This nonprovisional application is a U.S. National Stage Filing under 35 U.S.C. § 371 of international Patent Application Serial No. PCT/IB2017/056040 filed Sep. 29, 2017 and entitled "Core Network, Awareness of User Equipment, UE, State" which claims priority to U.S. Provisional Patent Application No. 62/402,073 filed Sep. 30, 2016 both of which are hereby incorporated by reference in their entirety.

TECHNICAL FIELD

Certain embodiments of the present disclosure relate, in general, to wireless communications and, more particularly, to core network awareness of the state of a user equipment (UE), such as a UE state with respect to the radio access network (RAN).

INTRODUCTION

In a typical wireless, cellular, or radio communications network, wireless devices, also known as mobile stations, terminals, and/or User Equipment (UE), communicate via a Radio-Access Network (RAN) with one or more core networks. The RAN covers a geographical area that is divided into cells. Each cell is served by a base station (e.g., a radio base station (RBS), or network node, which in some networks may also be referred to as, for example, a "NodeB", "eNodeB" or "eNB"). A cell is a geographical area where radio coverage is provided by the radio base station at a base station site or an antenna site in case the antenna and the radio base station are not collocated. One radio base station may serve one or more cells.

A Universal Mobile Telecommunications System (UMTS) is a third generation (3G) mobile communication system that evolved from the second generation (2G) Global System for Mobile Communications (GSM). The UMTS terrestrial radio-access network (UTRAN) is essentially a RAN using wideband code-division multiple access (WCDMA) and/or High-Speed Packet Access (HSPA) to communicate with user equipment.

In a forum referred to as the Third Generation Partnership Project (3GPP) telecommunications suppliers propose and agree upon standards for third generation networks and UTRAN specifically, and investigate enhanced data rate and radio capacity. In some versions of the RAN, as in UMTS for example, several base stations may be connected (e.g., by landlines or microwave) to a controller node, such as a radio network controller (RNC) or a base station controller (BSC) that supervises and coordinates various activities of the plural base stations connected thereto. The RNCs are typically connected to one or more core networks.

Specifications for the Evolved Packet System (EPS) have been completed within the 3GPP and this work continues in the coming 3GPP releases. The EPS comprises the Evolved Universal Terrestrial Radio-Access Network (E-UTRAN), also known as the Long-Term Evolution (LTE), radio access, and the Evolved Packet Core (EPC), also known as System Architecture Evolution (SAE) core network. E-UTRAN/LTE is a variant of a 3GPP radio-access technology wherein the radio base station nodes are directly connected to the EPC core network rather than to RNCs. In general, in E-UTRAN/LTE the functions of a RNC are distributed between the radio base station nodes (e.g., eNodeBs in LTE) and the core network. The RAN of an EPS has an essentially flat architecture comprising radio base station nodes without reporting to RNCs.

Radio Resource Control (RRC) may be used in the control plane. The main functions of the control plane include the following: broadcast of system information for both Non-Access Stratum (NAS) and Access Stratum (AS) paging; RRC connection handling; allocation of temporary identifiers for the UE; configuration of signaling radio bearer(s) for RRC connection; handling of radio bearers; Quality-of-Service (QoS) management functions; security functions including key management; mobility functions (including UE measurement reporting and control of the reporting, handover, UE cell selection and reselection and control of cell selection and reselection); and NAS direct message transfer to/from the UE.

One Packet Data Convergence Protocol (PDCP) entity exists for each radio bearer for the UE. PDCP is used for both control plane (i.e., RRC) and for user plane (i.e., user data received via GPRS tunneling protocol-user tunneling (GTP-U) signaling). A main function of the control plane is ciphering/deciphering and integrity protection. Main functions of the user plane include: ciphering/deciphering, header compression and decompression using Robust Header Compression (ROHC) and in-sequence delivery, duplicate detection and retransmission.

The Radio Link Control (RLC) layer provides services for the PDCP layer. One RLC entity exists for each radio bearer for the UE. Main functions for both control and user plane include: segmentation/concatenation, retransmission handling, duplicate detection, and in-sequence delivery to higher layers.

The Medium Access Control (MAC) provides services to the RLC layer in the form of logical channels, and performs mapping between the logical channels and transport channels. Main MAC functions include: uplink and downlink scheduling, scheduling information reporting, Hybrid Automatic Repeat reQuest (HARQ) retransmissions, and multiplexing/de-multiplexing data across multiple component carriers for carrier aggregation.

The Physical Layer (PHY) provides services to the MAC layer in the form of transport channels and handles mapping of transport channels to physical channels.

Information relating to one or more of these protocol layers and their functionality is hereinafter referred to as RAN context information. In other words, the configuration of these protocol layers for a particular wireless device would be the RAN context information of the particular wireless device in the wireless communications network. The configuration of the protocol layers is typically done on the RRC layer via RRC configuration messages.

One example of configuration specific information is different identifiers on the different protocol layers for the wireless device. The RAN context information may further include additional information, such as, for example, radio access capabilities of the wireless device, previous mobility or traffic history of the wireless device, etc.

The above described functionality of the network node (e.g., eNB) may be deployed in different ways. In one example, all the protocol layers and related functionality are deployed in the same physical node, including the antenna. One example of this is a Pico or Femto eNodeB. Another example is a Main-Remote split. In this case, the eNodeB is divided into a main unit and a remote unit. The main unit may also be referred to as a Digital Unit (DU), and the remote unit also referred to as a Remote Radio Unit (RRU). In this case, the main unit comprises all the protocol layers, except the lower parts of the PHY layer, which are instead placed in the remote unit. In a further example, remote unit and the antenna are co-located. This may be referred to as an Antenna Integrated Radio (AIR) system.

A RAN may handle inactive UEs. The 3GPP contribution R3-161290 (available from www.3gpp.org at /ftp/tsg_ran/WG3_Iu/TSGR3_92/Docs/R3-161290.zip; incorporated herein by reference) to the 3GPP RAN 3 WG meeting in May 2016 includes a proposal for a RAN controlled inactive state as described below.

If a RAN controlled inactive mode is supported this means that the transition from inactive to active state in the RAN will be transparent to the CN. In the downlink, by default downlink packets will be sent to the last node where the UE was connected (anchor RAN node). That node is responsible for initiating UE paging within the paging area that the UE is allowed to move in without notifying the network. In the uplink, the UE performs a RAN level procedure to transition to active state to transmit data. If the UE has moved to a different RAN node, then the new RAN node will most likely fetch the UE context from another RAN node, and if needed notify the CN that the UE has moved to a new node. If the UE moves outside the paging area, the UE may notify the network about the mobility so that the paging area can be updated. This procedure could trigger a RAN node relocation or the RAN node can be kept.

The following RAN functions may be included for inactive mode: (a) paging for downlink data; (b) context fetch to handle moving UEs (may be similar to existing LTE procedure); and (c) mobility updating (possible this could use similar mechanism as context fetch). To enable these mechanisms, the UE needs to be allocated a RAN identifier uniquely identifying the UE context in the RAN. In case there is any failure where it is not possible to retrieve the UE RAN context it is assumed that the RAN context can be rebuild as it would happen in the case of a new connection setup. Examples are illustrated in FIGS. 1 and 2.

FIGS. 1 and 2 are block diagrams illustrating signaling between a core network node, a network node, and a wireless device. In FIG. 1, core network node 320 is in communication with 3 network nodes 120. UE 110 was last connected to network node 120b. UE 110 my move around in the local area without reporting to the network. Core network node 320 maintains the connection to network node 120b.

When a packet arrives for delivery to UE 110, core network node 320 contacts network node 120b. Network node 120b pages UE 110. Network node 120b also instructs network nodes 120a and 120b to page UE 110.

In FIG. 2, core network node 320 is in communication with 3 network nodes 120. UE 110 was last connected to network node 120b. UE 110 my move around in the local area without reporting to the network. Core network node 320 maintains the connection to network node 120b.

When a UE 110 has data to transmit, UE 110 sends a connection request or mobility update to network node 120a, for example. Network node 120a sends a path switch request to core network node 320. Network node 120a also fetches the context of UE 110 from network node 120b.

The Next Generation (NG) core network should account for the state machines included in RRC protocol within new RAT. For example, the mobility state machine for RRC may have an Inactive Connected state (in addition to an RRC Connected state and an RRC Idle state). The Inactive Connected state may also be referred to as the Inactive state. Configurability of the RRC Inactive Connected state may be needed to support features that require flexibility, such as diverse requirements of the 5G use cases, future-proofness and quick time to market requirement for new services.

From the Next Generation core network perspective, a UE is considered to be in the NG CM-CONNECTED state when UE is in RRC Inactive Connected state at the RRC layer. RRC Inactive Connected is a state in which the UE, at Access Stratum (AS) level behaves as if it was in RRC_IDLE. However, the UE still enjoys a dedicated active signaling connection and user plane channels between its serving RAN node and the CN. When the UE transitions between RRC Connected state and RRC Inactive Connected state, the event is not visible to the core network because no signaling towards the core network is expected based on the transition. Also, the core network does not have to page the UE when the UE is in RRC Inactive Connected state because both control plane and user plane remains established between the RAN and core.

Characteristics of the RRC Inactive Connected state include: (a) UE is considered to be in the NG CM-CONNECTED state in UE and CN; (b) configurable to serve the service(s) requested by the UE, which means that the RRC Inactive Connected state can be configured based on the characteristics and requirements of the application(s) running in the UE, subscription, and UE activity (the core network may provide that related information to RAN); (c) UE based mobility inspired by cell reselection procedure with configuration from network, no network controlled handover is supported; (d) UE performs Area registration to CN when the UE moves outside of the registered area(s); (e) the Access Stratum (AS) context is stored in RAN and the UE; (f) RRC Inactive Connected to RRC Connected state transition inspired by the Suspend and Resume procedures defined for LTE in Rel-13 (signaling to the CN is not needed to perform the transition and the AS Context may be transferred between the RAN nodes); (g) U-plane and C-plane connections between RAN and core are kept established; (h) UE reachability will be managed by the RAN, with assistance from core network; (i) UE paging will be managed by the RAN; (j) CN will transit to the NG-CM IDLE state upon RAN request; (k) distributed mobility management where the network follows UE on CN level; (l) no Rx/Tx Data is performed in this state; (m) to support LTE and NR deployments in an efficient way, the solution for state transition shall avoid or minimize UE signaling when UE is toggling between NR and Evolved E-UTRA in Inactive state.

FIG. 3 is a state transition diagram illustrating the RRC state machine within the NG CM/MM State machine model when using the RRC INACTIVE CONNECTED state. A problem with the particular state machine is that the transitions between RRC CONNECTED and RRC CONNECTED INACTIVE are considered to be conducted without signaling to the NGCN. This impacts certain functions supported in the CN (e.g., information about UE's location after transition into RRC CONNECTED INACTIVE can't be assumed reliable any longer because the UE does not inform the network about its whereabouts on a granularity as when it is in RRC CONNECTED, e.g. cell level).

SUMMARY

Particular embodiments include a radio access network (RAN) that provides a core network (CN) with information about whether a user equipment (UE) is or might be in radio resource control (RRC) Connected or RRC Connected Inactive (or simply Inactive) states. The information may be used by the CN to determine how to manage particular functions, such as functions that depend on knowledge or granularity of the UE's location.

According to a particular embodiment, a method performed by a Core Network node is disclosed. The CN node sends a request to a RAN node to subscribe to UE transitions between connected and connected inactive status. The CN node receives a subscription response message from the RAN node, and when a UE served by the RAN transitions from connected status to connected inactive status, the CN node receives a notification message from the RAN node. According to specific embodiments, the request from the CN node may also include parameters regarding the subscription. According to specific embodiments, the request to subscribe and the subscription response message may be included in an initial context setup between the RAN node and the CN node.

According to another embodiment, a method performed by a RAN node is disclosed. The RAN node determines that a UE served by the RAN could potentially transition from connected status to connected inactive status. The RAN node sends a message to a Core Network node indicating the potential transition. According to specific embodiments, the message may be included in an initial context setup between the RAN node and the CN node.

According to a particular embodiment, a Core Network node is disclosed. The CN node comprises processing circuitry configured to send a request to a RAN node to subscribe to UE transitions between connected and connected inactive status. The processing circuitry is further configured to receive a subscription response message from the RAN node, and when a UE served by the RAN transitions from connected status to connected inactive status, receives a notification message from the RAN node. According to specific embodiments, the request from the CN node may also include parameters regarding the subscription. According to specific embodiments, the request to subscribe and the subscription response message may be included in an initial context setup between the RAN node and the CN node.

According to another embodiment, a RAN node is disclosed. The RAN node comprises processing circuitry configured to determine that a UE served by the RAN could potentially transition from connected status to connected inactive status. The processing circuitry is further configured to send a message to a Core Network node indicating the potential transition. According to specific embodiments, the message may be included in an initial context setup between the RAN node and the CN node.

According to some embodiments, a method for use in a network node of providing a RRC state of UE to a core network node comprises: receiving, from the core network node, a request to receive a notification of a transition of the UE between a first RRC state and a second RRC state; determining the UE transitioned between the first RRC state and the second RRC state; and sending the notification of the transition of the UE between the first RRC state and the second RRC state to the core network node. The network node may send, to the core network node, a subscription response indicating that the network node will provide the notification.

In particular embodiments, the subscription request includes a request to receive location information of the UE. The subscription request may include a periodicity for receiving the notification. The periodicity specifies whether the notification is a one-time notification or a notification for each subsequent transition of the UE between the first RRC state and the second RRC state.

In particular embodiments, the notification includes location information of the UE. The first RRC state may be RRC CONNECTED and the second RRC state may be RRC CONNECTED INACTIVE (or simply RRC INACTIVE). The subscription request may comprise an information element (IE) in a INITIAL CONTEXT SETUP REQUEST and the subscription response may comprise an IE in a INITIAL CONTEXT SETUP RESPONSE.

According to some embodiments, a network node capable of providing a RRC state of a UE to a core network node comprises processing circuitry. The processing circuitry is operable to: receive, from the core network node, a request to receive a notification of a transition of the UE between a first RRC state and a second RRC state; determine the UE transitioned between the first RRC state and the second RRC state; and send the notification of the transition of the UE between the first RRC state and the second RRC state to the core network node. The processing circuitry may be further operable to send, to the core network node, a subscription response indicating that the network node will provide the notification.

In particular embodiments, the subscription request includes a request to receive location information of the UE. The subscription request may include a periodicity for receiving the notification. The periodicity specifies whether the notification is a one-time notification or a notification for each subsequent transition of the UE between the first RRC state and the second RRC state.

In particular embodiments, the notification includes location information of the UE. The first RRC state may be RRC CONNECTED and the second RRC state may be RRC CONNECTED INACTIVE. The subscription request may comprise an IE in a INITIAL CONTEXT SETUP REQUEST and the subscription response may comprise an IE in a INITIAL CONTEXT SETUP RESPONSE.

According to some embodiments, a method for use in a core network node of receiving RRC state information of a UE comprises: sending, to the network node, a subscription request to receive a notification of a transition of the UE between a first RRC state and a second RRC state; and upon the network node determining the UE transitioned between the first RRC state and the second RRC state, receiving the notification from the network node. The core network node may receive, from the network node, a subscription response indicating that the network node will provide the notification.

In particular embodiments, the subscription request includes a request to receive location information of the UE. The subscription request may include a periodicity for receiving the notification.

In particular embodiments, the notification includes location information of the UE. The first RRC state may be RRC CONNECTED and the second RRC state may be RRC CONNECTED INACTIVE (or RRC INACTIVE). The subscription request may comprise an IE in a INITIAL CONTEXT SETUP REQUEST and the subscription response may comprise an IE in a INITIAL CONTEXT SETUP RESPONSE.

In particular embodiments, the method further comprises modifying an operation of the core network node with respect to the UE based on the received notification.

According to some embodiments, a core network node capable of receiving RRC state information of a UE comprising processing circuitry. The processing circuitry is operable to: send, to the network node, a subscription request to receive a notification of a transition of the UE between a first RRC state and a second RRC state; and upon the network node determining the UE transitioned between the first RRC state and the second RRC state, receive the notification from the network node. The processing circuitry may be further operable to receive, from the network node, a subscription response indicating that the network node will provide the notification.

In particular embodiments, the subscription request includes a request to receive location information of the UE. The subscription request may include a periodicity for receiving the notification.

In particular embodiments, the notification includes location information of the UE. The first RRC state may be RRC CONNECTED and the second RRC state may RRC CONNECTED INACTIVE. The subscription request may comprise an IE in a INITIAL CONTEXT SETUP REQUEST and the subscription response comprises an IE in a INITIAL CONTEXT SETUP RESPONSE.

In particular embodiments, the processing circuitry is further operable to modify an operation of the core network node with respect to the UE based on the received notification.

According to some embodiments, a network node capable of providing a RRC state of a UE to a core network node comprises a receiving module, a determining module, and a transmitting module. The receiving module is operable to receive, from the core network node, a request to receive a notification of a transition of the UE between a first RRC state and a second RRC state. The determining module operable to determine the UE transitioned between the first RRC state and the second RRC state. The transmitting module is operable to send the notification of the transition of the UE between the first RRC state and the second RRC state to the core network node.

According to some embodiments, a core network node capable of receiving RRC state information of a UE comprises a receiving module and a transmitting module. The transmitting module is operable to send, to the network node, a subscription request to receive a notification of a transition of the UE between a first RRC state and a second RRC state. The receiving module is operable to, upon the network node determining the UE transitioned between the first RRC state and the second RRC state, receive the notification from the network node.

Also disclosed is a computer program product. The computer program product comprises instructions stored on non-transient computer-readable media which, when executed by a processor, perform the steps of: receiving, from the core network node, a request to receive a notification of a transition of the UE between a first RRC state and a second RRC state; determining the UE transitioned between the first RRC state and the second RRC state; and sending the notification of the transition of the UE between the first RRC state and the second RRC state to the core network node.

Another computer program product comprises instructions stored on non-transient computer-readable media which, when executed by a processor, perform the steps of: sending, to the network node, a subscription request to receive a notification of a transition of the UE between a first RRC state and a second RRC state; and upon the network node determining the UE transitioned between the first RRC state and the second RRC state, receiving the notification from the network node.

Certain embodiments of the present disclosure may provide one or more technical advantages. For example, some embodiments may advantageously enable the CN to subscribe to certain information available in RAN (e.g., the UE transition between RRC CONNECTED and RRC CONNECTED INACTIVE). The CN can use the information as input to its functions (e.g., based on the reliability of the knowledge about UE's location). As an example, the CN could adjust its behavior for UE location monitoring during periods of inactive connected state when the UE is not connected to the system at AS level and when it would not necessarily report a change of location (e.g., change of cell). Other advantages may be readily available to one having skill in the art. Certain embodiments may have none, some, or all of the recited advantages.

BRIEF DESCRIPTION OF THE DRAWINGS

For a more complete understanding of the embodiments and their features and advantages, reference is now made to the following description, taken in conjunction with the accompanying drawings, in which:

FIG. 13A is a block diagram illustrating an example embodiment of a core network node; and FIG. 13B is a block diagram illustrating example components of a core network node.

DETAILED DESCRIPTION

Figure 1:
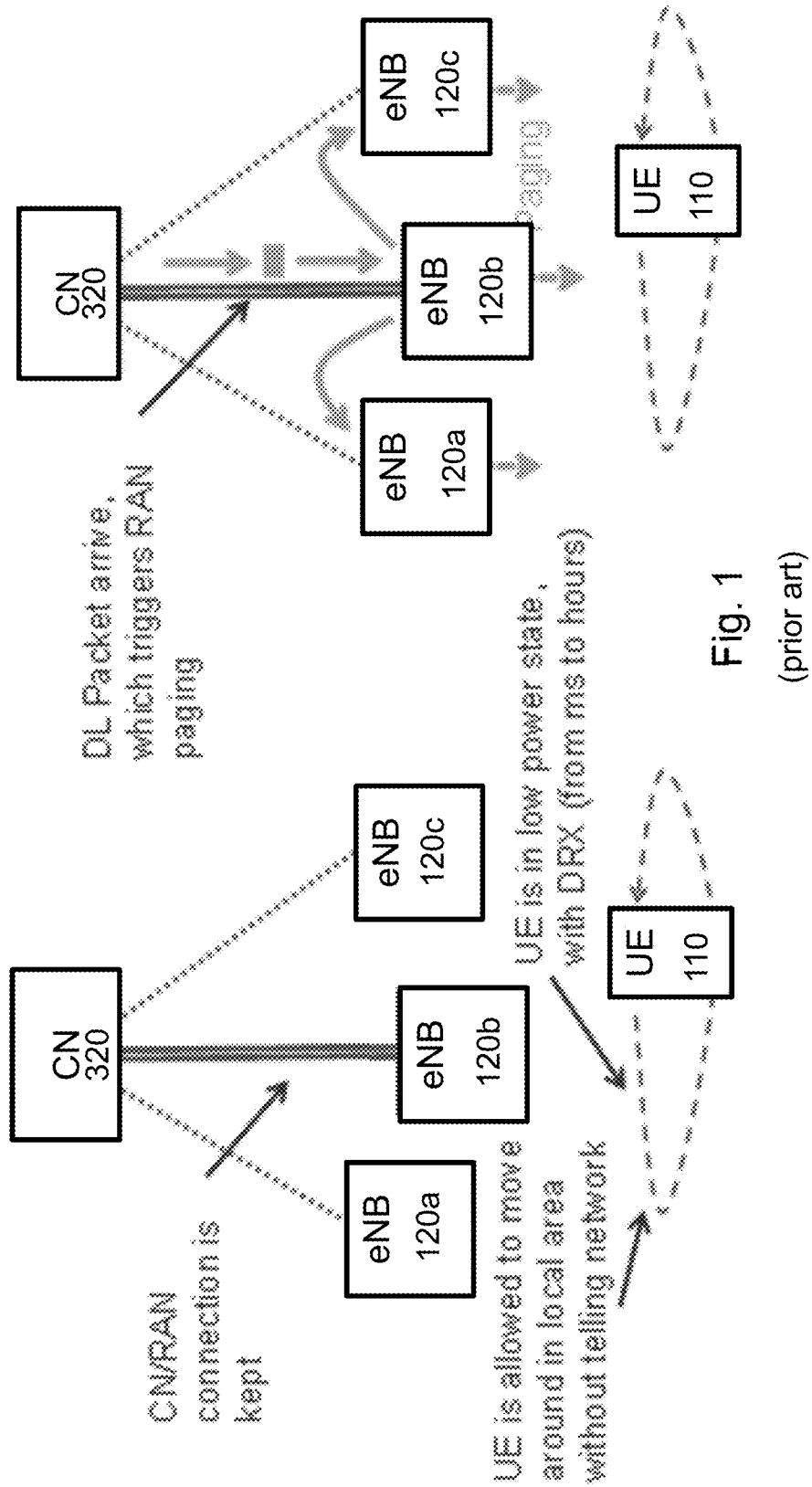
FIGS. 1 and 2 are block diagrams illustrating signaling between a core network node, a network node, and a wireless device.
Figure 2:
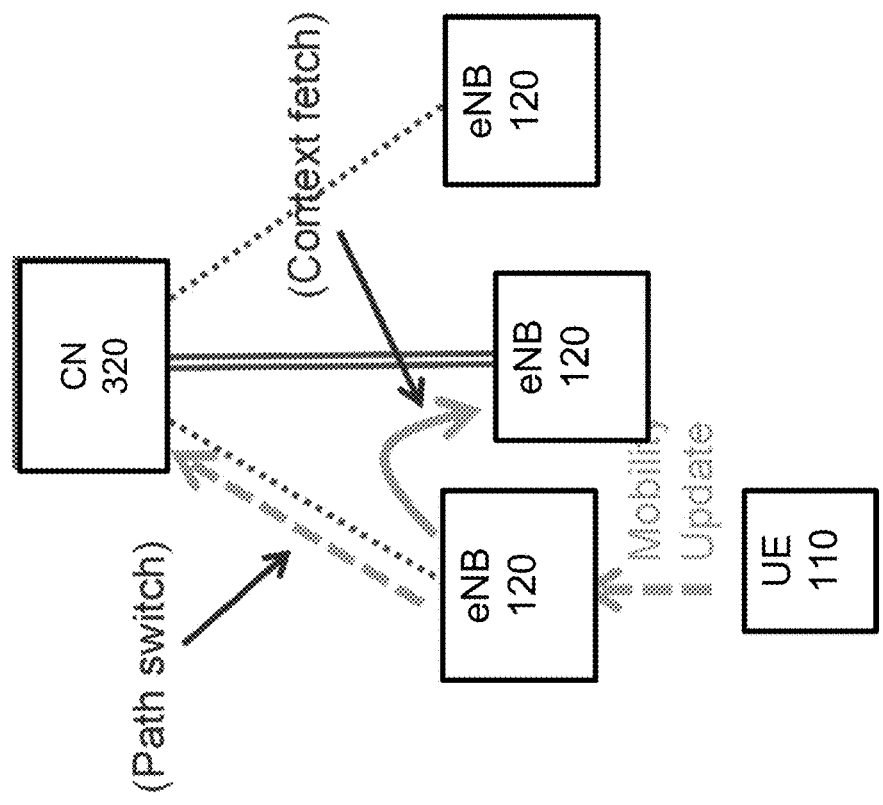
Figure 2:
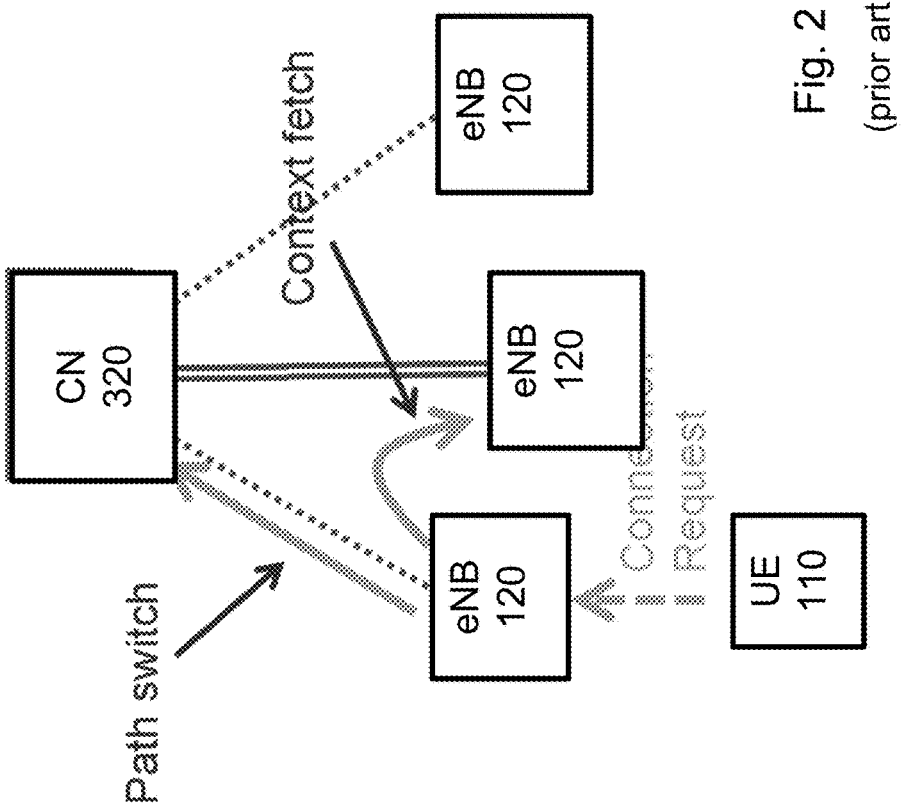
Figure 3:
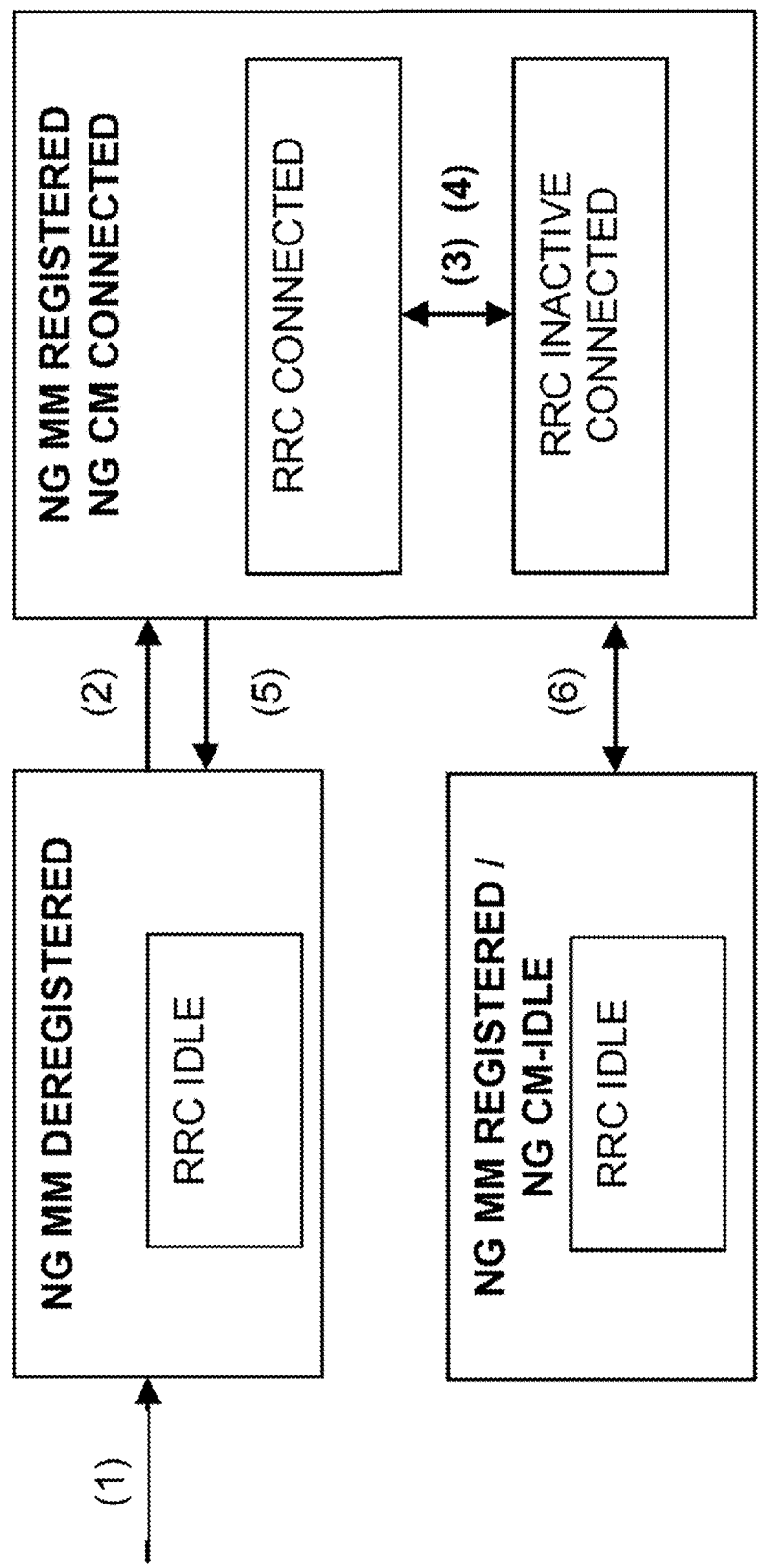
FIG. 3 is a state transition diagram illustrating the RRC state machine within the NG CM/MM State machine model when using the RRC INACTIVE CONNECTED state.

The Next Generation (NG) core network should account for the state machines included in radio resource control (RRC) protocol within 5G new radio (NR). For example, the mobility state machine for RRC may have an Inactive Connected state (in addition to an RRC Connected state and an RRC Idle state). The Inactive Connected state may also be referred to as the Inactive state. Configurability of the RRC Inactive Connected state may be needed to support features that require flexibility, such as diverse requirements of the 5G use cases, future-proofness and quick time to market requirement for new services.

From the Next Generation core network perspective, a user equipment (UE) is considered to be in the NG CM-CONNECTED state when UE is in RRC Inactive Connected state at the RRC layer. RRC Inactive Connected is a state in which the UE, at Access Stratum (AS) level behaves as if it was in RRC_IDLE. However, the UE still enjoys a dedicated active signaling connection and user plane channels between its serving RAN node and the core network (CN). When the UE transitions between RRC Connected state and RRC Inactive Connected state, the event is not visible to the core network because no signaling towards the core network is expected based on the transition. Also, the core network does not have to page the UE when the UE is in RRC Inactive Connected state because both control plane A problem with the particular state machine is that the transitions between RRC CONNECTED and RRC CONNECTED INACTIVE are considered to be conducted without signaling to the next generation core network (NGCN). This impacts certain functions supported in the CN (e.g., information about UE's location after transition into RRC CONNECTED INACTIVE can't be assumed reliable any longer because the UE does not inform the network about its whereabouts on a granularity as when it is in RRC CONNECTED, e.g. cell level).

Particular embodiments described herein obviate the problems described above and include embodiments include a RAN that provides a core network with information about whether a UE is or might be in RRC Connected or RRC Connected Inactive (or simply Inactive) states. The information may be used by the core network to determine how to manage particular functions, such as functions that depend on knowledge or granularity of the UE's location.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 4-13B of the drawings, like numerals being used for like and corresponding parts of the various drawings. LTE and NR are used throughout this disclosure as example cellular systems, but the ideas presented herein may apply to other wireless communication systems as well.

Figure 4:
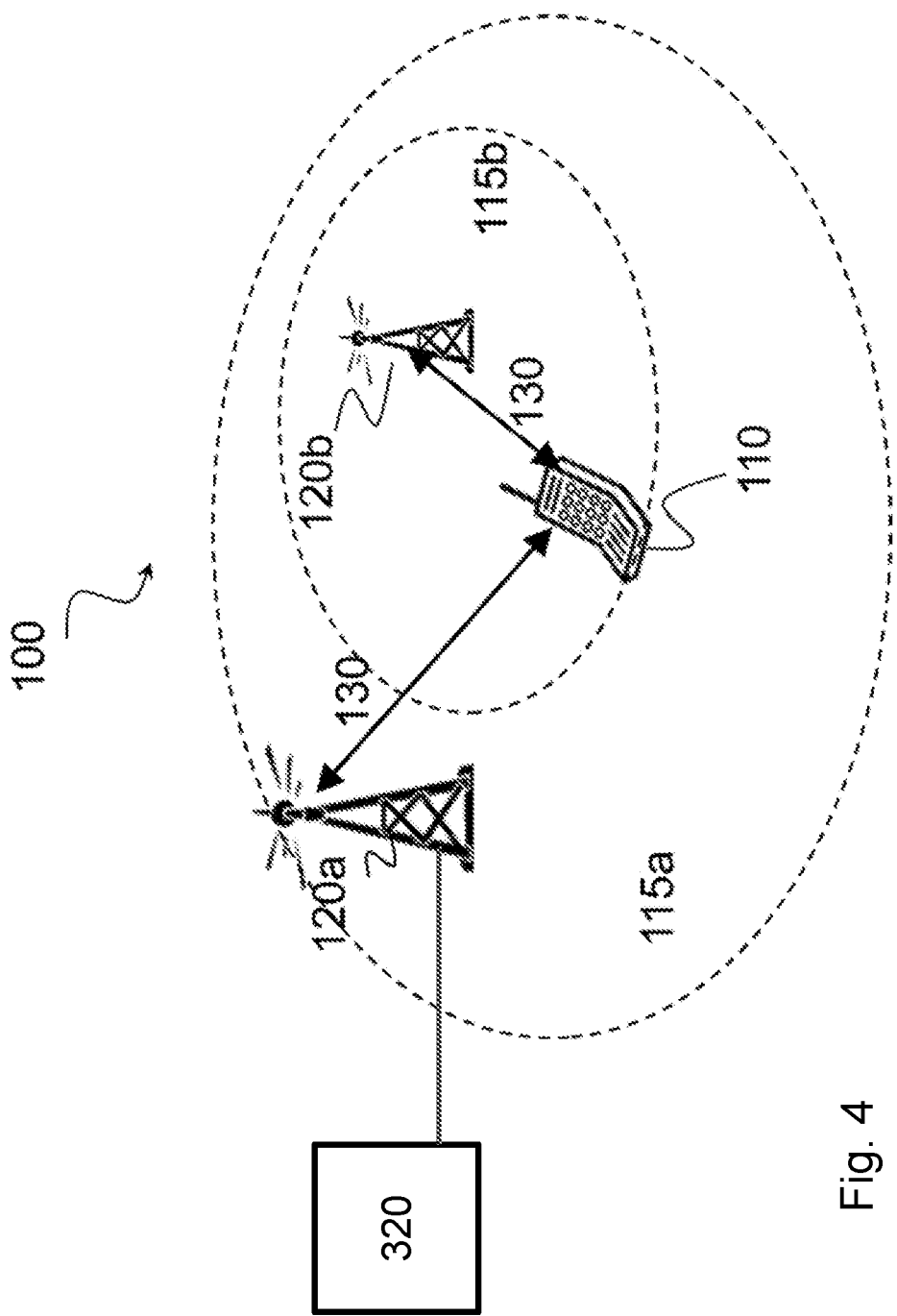
FIG. 4 is a block diagram illustrating an example wireless network, according to a particular embodiment.

FIG. 4 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110.

In some embodiments, wireless device 110 may be referred to by the non-limiting term "UE." A UE may include any type of wireless device capable of communicating with a network node or another UE over radio signals. The UE may comprise radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

In some embodiments, network node 120 may include any type of network node such as a base station, radio base station, base transceiver station, base station controller, network controller, evolved Node B (eNB), Node B, multi-RAT base station, Multi-cell/multicast Coordination Entity (MCE), relay node, access point, radio access point, Remote Radio Unit (RRU) Remote Radio Head (RRH), a core network node (e.g., MME, SON node, a coordinating node, etc.), or even an external node (e.g., 3rd party node, a node external to the current network), etc.

Wireless signals 130 may include both downlink transmissions (from radio network node 120 to wireless devices 110) and uplink transmissions (from wireless devices 110 to radio network node 120).

Each network node 120 may have a single transmitter or multiple transmitters for transmitting wireless signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120.

Network 100 may include carrier aggregation. For example, wireless device 110 may be served by both network node 120a and 120b and communicate wireless signals 130 with both network node 120a and 120b.

In certain embodiments, network nodes 125 may interface with a radio network controller (RNC). The radio network controller may control network nodes 120 and may provide certain radio resource management functions, mobility management functions, and/or other suitable functions. In certain embodiments, the functions of the radio network controller may be included in network node 120. The radio network controller may interface with a core network node (CN), such as core network node 320.

In certain embodiments, the radio network controller may interface with core network node 320 via an interconnecting wired or wireless network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 320 may manage the establishment of communication sessions and various other functionalities for wireless devices 110. wireless devices 110 may exchange certain signals with core network node 320 using the non-access stratum layer. In non-access stratum signaling, signals between wireless devices 110 and core network node 320 may be transparently passed through the radio access network. In certain embodiments, network nodes 120 may interface with one or more network nodes 120 over an internode interface, such as, for example, an X2 interface.

Wireless device 110 may include state information, such as radio resource control (RRC) state information For example, wireless device 110 may be in one of an IDLE, CONNECTED, or CONNECTED INACTIVE RRC state. Network node 120 (or radio node controller) may control the state of wireless device 110. In some embodiments, network node 120 may send notifications to core network node 320 about the state, or state transitions of, wireless device 110. For example, core network node 320 may register or subscribe to a state change notification for wireless device 110. Upon determining a state change, network node 120 may notify core network node 320 of the state change. The notification may include location information. State notifications are described in more detail below with respect to FIGS. 5-10.

In wireless network 100, each radio network node 120 may use any suitable radio access technology, such as long term evolution (LTE), LTE-Advanced, NR, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described below with respect to FIG. 11. Similarly, a network node may include any suitable combination of hardware and/or software. For example, in particular embodiments, a network node, such as network node 120, may include the components described below with respect to FIG. 12A. A core network node may include any suitable combination of hardware and/or software. For example, in particular embodiments, a core network node, such as core network node 320, may include the components described below with respect to FIG. 13A.

The embodiments disclosed herein are based on the principle that the core network becomes aware of whether a UE is in RRC CONNECTED INACTIVE or might become a subject to RRC CONNECTED INACTIVE. Two groups of embodiments are disclosed-subscription-based notification and autonomous RAN-initiated notification. These primary embodiments, including variations thereof, are described in more detail below.

Particular embodiments include subscription based notification. According to certain embodiments, the CN subscribes to the RAN so the RAN provides information about the UE, including whether UE is in RRC CONNECTED or RRC CONNECTED INACTIVE, to the CN. The information may be used by the CN to determine how to manage certain functions, e.g., with regards to knowledge about the granularity the UE's location.

Particular embodiments include a stand-alone subscription procedure that includes a procedure on the CN/RAN interface. An example is illustrated in FIG. 4.

Figure 5:
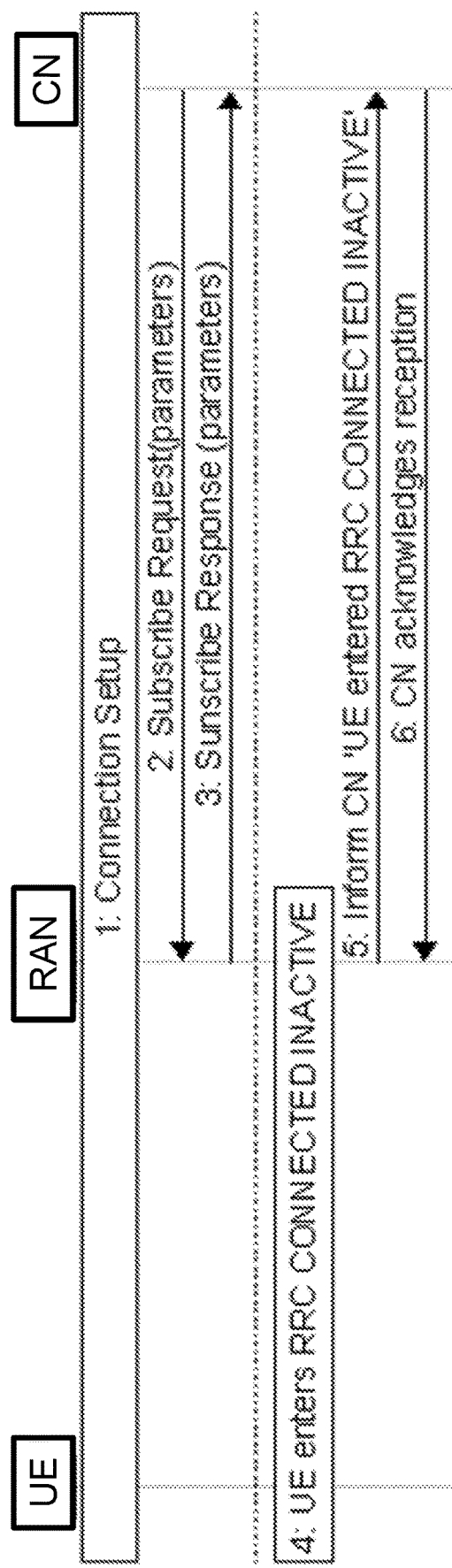
FIG. 5 is a sequence diagram illustrating a core network subscription to the radio access network, according to some embodiments.

FIG. 5 is a sequence diagram illustrating a core network subscription to the radio access network, according to some embodiments. At step 1, a UE is connected to the network and can receive and transfer user plane data and control plane data. At step 2, the core network sends to the RAN a request to subscribe to UE transitions between RRC CONNECTED and RRC CONNECTED INACTIVE. The request may include parameters describing details of the subscription and/or specific data requests (e.g., current location request).

At step 3, the RAN provides a response to the core network indicating whether the RAN accepted the subscription request from step 2 and provides details related to the accepted subscription and/or requested data (e.g., current location response). At step 4, upon the UE transition (e.g., from RRC CONNECTED to RRC CONNECTED INACTIVE), the RAN sends a notification to the core network. The notification may include parameters describing UE behavior configured by the network. The parameters may have been requested in step 2.

Another alternative is to include a subscription mechanism in the Connection Setup procedure, i.e. already in step 1 in FIG. 4. The alternative embodiment is detailed below based on Initial UE Context Setup procedure in LTE. The new function is shown in relation to current standardized procedure. For example, the embodiment may be described in relation to the Connection Setup procedure described in Section 8.3.1 of 3GPP TS 36.413v13.3.0 (the entirety of which is incorporated herein by reference). According to certain embodiments, the subscription procedure is embedded in the UE context setup procedure on the CN/RAN interface.

The purpose of the Initial Context Setup procedure is to establish the necessary overall initial UE Context including E-RAB context, the Security Key, Handover Restriction List, UE Radio capability and UE Security Capabilities etc. The procedure uses UE-associated signaling. An example is illustrated in FIG. 6.

Figure 6:
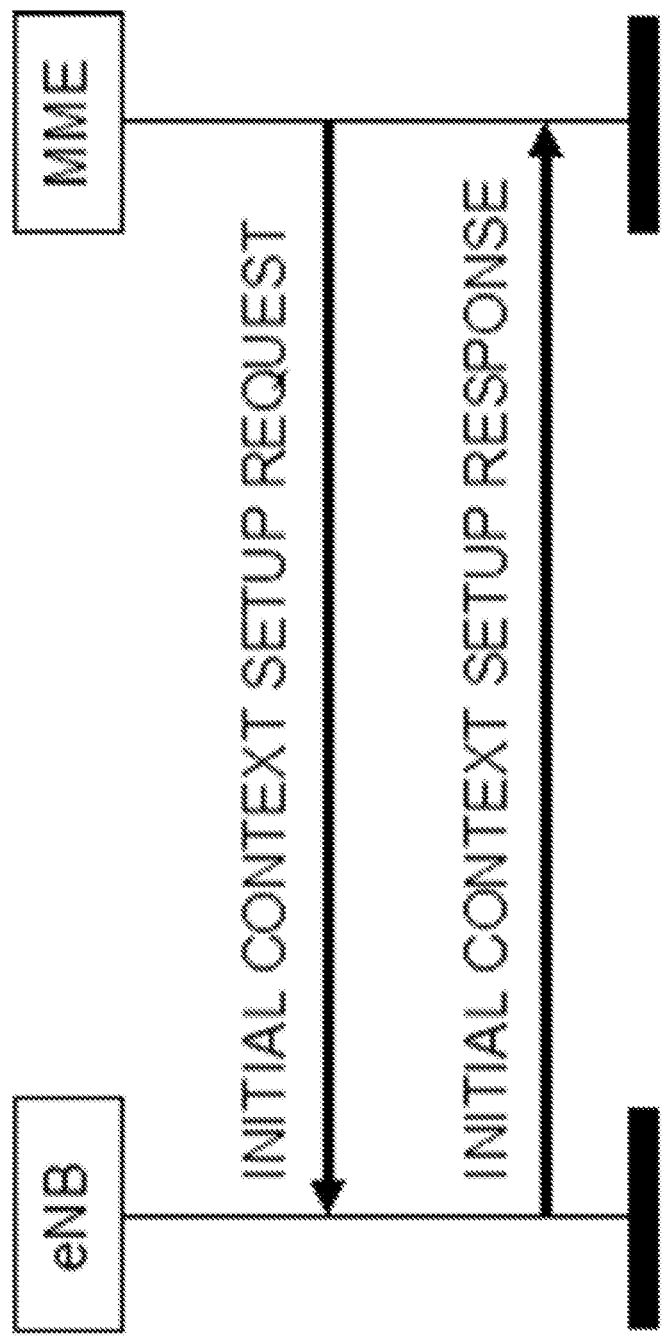
FIG. 6 is a signaling diagram illustrating an initial context setup procedure, according to some embodiments.

FIG. 6 is a signaling diagram illustrating an initial context setup procedure, according to some embodiments. The signaling diagram is a reproduction of FIG. 8.3.1.2-1 from 3GPP TS 36.413v13.3.0.

In case of the establishment of an E-RAB the EPC must be prepared to receive user data before the INITIAL CONTEXT SETUP RESPONSE message has been received by the MME. If no UE-associated logical S1-connection exists, the UE-associated logical S1-connection shall be established at reception of the INITIAL CONTEXT SETUP REQUEST message.

The INITIAL CONTEXT SETUP REQUEST message shall contain within the E-RAB to be Setup List IE the information required by the eNB to build the new E-RAB configuration consisting of at least one additional E-RAB.

The E-RAB to be Setup Item IE may contain:
the NAS-PDU IE,
the Correlation ID IE in case of LIPA operation,
the SIPTO Correlation ID IE in case of SIPTO@LN
    operation,
the Bearer Type IE.
The INITIAL CONTEXT SETUP REQUEST message
may contain
    the Trace Activation IE.
    the Handover Restriction List IE, which may contain
        roaming or access restrictions.
    the UE Radio Capability IE.
    the Subscriber Profile ID for RAT/Frequency priority IE.
    the CS Fallback Indicator IE.
    the SRVCC Operation Possible IE.
    the CSG Membership Status IE.
    the Registered LAI IE.
    the GUMMEI IE, which indicates the MME serving the
        UE, and shall only be present according to subclauses
        4.6.2 and 4.7.6.6 of TS 36.300.
    the MME UE S1AP ID 2 IE, which indicates the MME
        UE S1AP ID assigned by the MME, and shall only be
        present according to subclause 4.6.2 of TS 36.300.
    the Management Based MDT Allowed IE.
    the Management Based MDT PLMN List IE.
    the Additional CS Fallback Indicator IE.
    the Masked IMEISV IE.
    the Expected UE Behavior IE.
    the ProSe Authorized IE.
    the UE User Plane CIoT Support Indicator IE.
    the Subscription Request IE, e.g. subscribing to the UE
        transition between RRC CONNECTED and RRC
        CONNECTED INACTIVE
The INITIAL CONTEXT SETUP REQUEST message
shall contain the Subscriber Profile ID for RAT/Frequency
priority IE, if available in the MME.
    If the Correlation ID IE is included in the INITIAL
CONTEXT SETUP REQUEST message towards the eNB
with L-GW function for LIPA operation, then the eNB shall
use this information for LIPA operation for the concerned
E-RAB.
    If the SIPTO Correlation ID IE is included in the INITIAL
CONTEXT SETUP REQUEST message towards the eNB
with L-GW function for SIPTO@LN operation, then the
eNB shall use this information for SIPTO@LN operation for
the concerned E-RAB.
    If the Bearer Type IE is included in the INITIAL CON-
TEXT SETUP REQUEST message and is set to "non IP",
then the eNB shall not perform header compression for the
concerned E-RAB.
    If the Masked IMEISV IE is contained in the INITIAL
CONTEXT SETUP REQUEST the target eNB shall, if
supported, use it to determine the characteristics of the UE
for subsequent handling.
    If the Expected UE Behaviour IE is included in the
INITIAL CONTEXT SETUP REQUEST message, the eNB
shall, if supported, store this information and may use it to
determine the RRC connection time.
    Upon receipt of the INITIAL CONTEXT SETUP
REQUEST message the eNB shall
    attempt to execute the requested E-RAB configuration.
    store the UE Aggregate Maximum Bit Rate in the UE
        context, and use the received UE Aggregate Maximum
        Bit Rate for non-GBR Bearers for the concerned UE.
    pass the value contained in the E-RAB ID IE and the
        NAS-PDU IE received for the E-RAB for each estab-
        lished Data radio bearer to the radio interface protocol.

The eNB shall not send the NAS PDUs associated to
    the failed Data radio bearers to the UE.
store the received Handover Restriction List in the UE
    context.
store the received UE Radio Capability in the UE context.
store the received Subscriber Profile ID for RAT/Fre-
    quency priority in the UE context and use it as defined
    in TS 36.300.
store the received SRVCC Operation Possible in the UE
    context and use it as defined in TS 23.216.
store the received UE Security Capabilities in the UE
    context.
store the received Security Key in the UE context, take it
    into use and associate it with the initial value of NCC
    as defined in TS 33.401.
store the received CSG Membership Status, if supported,
    in the UE context.
store the received Management Based MDT Allowed
    information, if supported, in the UE context.
store the received Management Based MDT PLMN List
    information, if supported, in the UE context.
store the received ProSe Authorization information, if
    supported, in the UE context.
evaluate the Subscription Request IE and the included
    associated parameters describing the information that
    the CN requests to be informed about and the way (e.g.
    periodicity etc.) this information is requested to be
    provided.
For the Initial Context Setup an initial value for the Next
Hop Chaining Count is stored in the UE context.
    The allocation of resources according to the values of the
Allocation and Retention Priority IE shall follow the prin-
ciples described for the E-RAB Setup procedure.
    The eNB shall use the information in the Handover
Restriction List IE if present in the INITIAL CONTEXT
SETUP REQUEST message to
    determine a target for subsequent mobility action for
        which the eNB provides information about the target of
        the mobility action towards the UE, except if the CS
        Fallback Indicator IE is set to "CS Fallback High
        Priority" and the Additional CS Fallback Indicator IE is
        not present in which case the eNB may use the infor-
        mation in the Handover Restriction List IE;
    select a proper SCG during dual connectivity operation.
    If the Handover Restriction List IE is not contained in the
INITIAL CONTEXT SETUP REQUEST message, the eNB
shall consider that no roaming and no access restriction
apply to the UE. The eNB shall also consider that no
roaming and no access restriction apply to the UE when:
    one of the setup E-RABs has a particular ARP value (TS
        23.401);
    the CS Fallback Indicator IE is set to "CS Fallback High
        Priority" and the Additional CS Fallback Indicator IE is
        not present and, in case the Handover Restriction List
        IE is applied, no suitable target is found, in which case
        it shall process according to TS 23.272;
    the CS Fallback Indicator IE is set to "CS Fallback High
        Priority" and the Additional CS Fallback Indicator IE is
        set to "no restriction", in which case it shall process
        according to TS 23.272.
    If the Trace Activation IE is included in the INITIAL
CONTEXT SETUP REQUEST message then eNB shall, if
supported, initiate the requested trace function as described
in TS 32.422. In particular, the eNB shall, if supported:
    if the Trace Activation IE does not include the MDT
        Configuration IE, initiate the requested trace session as
        described in TS 32.422;

if the Trace Activation IE includes the MDT Activation IE, within the MDT Configuration IE, set to "Immediate MDT and Trace", initiate the requested trace session and MDT session as described in TS 32.422;

if the Trace Activation IE includes the MDT Activation IE, within the MDT Configuration IE, set to "Immediate MDT Only", "Logged MDT only" or "Logged MBSFN MDT", initiate the requested MDT session as described in TS 32.422 and the eNB shall ignore Interfaces To Trace IE, and Trace Depth IE.

if the Trace Activation IE includes the MDT Location Information IE, within the MDT Configuration IE, store this information and take it into account in the requested MDT session.

if the Trace Activation IE includes the Signaling based MDT PLMN List IE, within the MDT Configuration IE, the eNB may use it to propagate the MDT Configuration as described in TS 37.320.

if the Trace Activation IE includes the MBSFN-ResultToLog IE, within the MDT Configuration IE, take it into account for MDT Configuration as described in TS 37.320.

if the Trace Activation IE includes the MBSFN-AreaId IE in the MBSFN-ResultToLog IE, within the MDT Configuration IE, take it into account for MDT Configuration as described in TS 37.320.

If the CS Fallback Indicator IE is included in the INITIAL CONTEXT SETUP REQUEST message, it indicates that the UE Context to be set-up is subject to CS Fallback. The eNB shall reply with the INITIAL CONTEXT SETUP RESPONSE message and then act as defined in TS 23.272.

If the Registered LAI IE is included in the INITIAL CONTEXT SETUP REQUEST message, it indicates that the eNB may take the Registered LAI IE into account when selecting the target cell or frequency and then act as defined in TS 23.272.

If the UE Security Capabilities IE included in the INITIAL CONTEXT SETUP REQUEST message only contains the EIA0 algorithm as defined in TS 33.401 and if this EIA0 algorithm is defined in the configured list of allowed integrity protection algorithms in the eNB (TS 33.401), the eNB shall take it into use and ignore the keys received in the Security Key IE.

If the GUMMEI IE is contained in the INITIAL CONTEXT SETUP REQUEST message, the eNB shall, if supported, store this information in the UE context and use it for subsequent X2 handovers.

If the MME UE S1AP ID 2 IE is contained in the INITIAL CONTEXT SETUP REQUEST message, the eNB shall, if supported, store this information in the UE context and use it for subsequent X2 handovers.

If the Management Based MDT Allowed IE is contained in the INITIAL CONTEXT SETUP REQUEST message, the eNB shall use it, if supported, together with information in the Management Based MDT PLMN List IE, if available in the UE context, to allow subsequent selection of the UE for management based MDT defined in TS 32.422.

If the UE User Plane CIoT Support Indicator IE is included in the INITIAL CONTEXT SETUP REQUEST message and is set to "supported", the eNB shall, if supported, consider that User Plane CIoT EPS Optimisation as specified in TS 23.401 is supported for the UE.

The eNB shall report to the MME, in the INITIAL CONTEXT SETUP RESPONSE message, the successful establishment of the security procedures with the UE, and, the result for all the requested E-RABs in the following way:

A list of E-RABs which are successfully established shall be included in the E-RAB Setup List IE A list of E-RABs which failed to be established shall be included in the E-RAB Failed to Setup List IE.

When the eNB reports the unsuccessful establishment of an E-RAB, the cause value should be precise enough to enable the MME to know the reason for the unsuccessful establishment, e.g., "Radio resources not available", "Failure in the Radio Interface Procedure".

After sending the INITIAL CONTEXT SETUP RESPONSE message, the procedure is terminated in the eNB.

If the Subscription Request IE is included in the INITIAL CONTEXT SETUP REQUEST message, the eNB evaluates its contents and reply to the CN in the INITIAL CONTEXT SETUP RESPONSE message with the result of the subscription request, i.e. whether eNB will provide the information subscribed to from the CN and about the way the information (or a subset of it) will be provided.

With respect to the tabular description of the INITIAL CONTEXT SETUP REQUEST and INITIAL CONTEXT SETUP RESPONSE the additional IEs could be encoded as per the following example changes to current TS36.413, starting at Section 9.1.4.1:

9.1.4.1 Initial Context Setup Request

This message is sent by the MME to request the setup of a UE context.

Direction: MME→eNB

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | M | | 9.2.1.20 | | YES | reject |
| E-RAB to Be Setup List | | 1 | | | YES | reject |
| >E-RAB to Be Setup Item IEs | | 1 ... <maxnoofE-RABs> | | | EACH | reject |
| >>E-RAB ID | M | | 9.2.1.2 | | — | |
| >>E-RAB Level QoS Parameters | M | | 9.2.1.15 | Includes necessary QoS parameters. | — | |
| >>Transport Layer Address | M | | 9.2.2.1 | | — | |
| >>GTP-TEID | M | | 9.2.2.2 | | — | |

-continued

| IE/Group Name | Presence | Range | IE type and reference | Semantics description | Criticality | Assigned Criticality |
|---|---|---|---|---|---|---|
| >>NAS-PDU | O | | 9.2.3.5 | | — | |
| >>Correlation ID | O | | 9.2.1.80 | | YES | ignore |
| >>SIPTO Correlation ID | O | | Correlation ID 9.2.1.80 | | YES | ignore |
| >>Bearer Type | O | | 9.2.1.116 | | YES | reject |
| UE Security Capabilities | M | | 9.2.1.40 | | YES | reject |
| Security Key | M | | 9.2.1.41 | The KeNB is provided after the key-generation in the MME, see TS 33.401. | YES | reject |
| Trace Activation | O | | 9.2.1.4 | | YES | ignore |
| Handover Restriction List | O | | 9.2.1.22 | | YES | ignore |
| UE Radio Capability | O | | 9.2.1.27 | | YES | ignore |
| Subscriber Profile ID for RAT/ Frequency priority | O | | 9.2.1.39 | | YES | ignore |
| CS Fallback Indicator | O | | 9.2.3.21 | | YES | reject |
| SRVCC Operation Possible | O | | 9.2.1.58 | | YES | ignore |
| CSG Membership Status | O | | 9.2.1.73 | | YES | ignore |
| Registered LAI | O | | 9.2.3.1 | | YES | ignore |
| GUMMEI | O | | 9.2.3.9 | This IE indicates the MME serving the UE. | YES | ignore |
| MME UE S1AP ID 2 | O | | 9.2.3.3 | This IE indicates the MME UE S1AP ID assigned by the MME. | YES | ignore |
| Management Based MDT Allowed | O | | 9.2.1.83 | | YES | ignore |
| Management Based MDT PLMN List | O | | MDT PLMN List 9.2.1.89 | | YES | ignore |
| Additional CS Fallback Indicator | C-ifCSFBhighpriority | | 9.2.3.37 | | YES | ignore |
| Masked IMEISV | O | | 9.2.3.38 | | YES | ignore |
| Expected UE Behavior | O | | 9.2.1.96 | | YES | ignore |
| ProSe Authorized | O | | 9.2.1.99 | | YES | ignore |
| UE User Plane CIoT Support Indicator | O | | 9.2.1.113 | | YES | ignore |
| Subscription Request | O | | ENUMERATED (Active-Inactive State Indication, Location Information, Inactive State Indication And Location . . .) | | YES | ignore |

9.1.4.3 Initial Context Setup Response

This message is sent by the eNB to confirm the setup of a UE context.
Direction: eNB→MME

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | ignore |
| eNB UE S1AP ID | M | | 9.2.3.4 | | YES | ignore |
| E-RAB Setup List | | 1 | | | YES | ignore |
| >E-RAB Setup Item IEs | | 1 ... <maxnoofE-RABs> | | | EACH | ignore |
| >>E-RAB ID | M | | 9.2.1.2 | | — | |
| >>Transport Layer Address | M | | 9.2.2.1 | | — | |
| >>GTP-TEID | M | | 9.2.2.2 | | — | |
| E-RAB Failed to Setup List | O | | E-RAB List 9.2.1.36 | A value for E-RAB ID shall only be present once in E-RAB Setup List IE and E-RAB Failed to Setup List IE. | YES | ignore |
| Criticality Diagnostics | O | | 9.2.1.21 | | YES | ignore |
| Subscription Response | O | | ENUMERATED (Active-Inactive State Indication, Location Information, Inactive State Indication And Location, Subscription Rejected ...) | | YES | ignore |

In the IEs described in the tabular description above, the CN may send a request to the RAN for a subscription to provide different information. Examples include, but are not limited to, subscription to report transitions between active state (i.e., RRC_CONNECTED) and connected inactive state. Another example is to report location information (e.g., to report a change of location at cell level, at registration area level, or at tracking area level, etc.). Another example is to report both types of information together (i.e., indication of state transition and location information).

The RAN may respond by acknowledging subscription to the requested information, which will trigger future reporting via new or existing procedures both in acknowledged (Class1) and unacknowledged (Class2) mode, or by rejecting the subscription. Another way to encode the IEs in the request and response messages would be for the CN to list a number of information elements that the RAN is requesting a subscription for reporting. The RAN replies with an equivalent list, where the information for which subscription is accepted are included and where the information for which subscription is not acknowledged are not included. In the embodiment above, the CN includes a request for provisioning of certain type of information upon occurrence of specific events at UE context creation. Upon positive response from the eNB to the CN that the information will be provided as per configured rules, the RAN will signal to the CN the requested information when the configured events occur.

Such signalling may happen in various forms. The signalling may happen via a new Class 2 procedure, which includes the requested information. The signalling may occur via an existing procedure such as the UE Context Modification Indication/Confirm, which is illustrated in FIG. 7.

Figure 7:
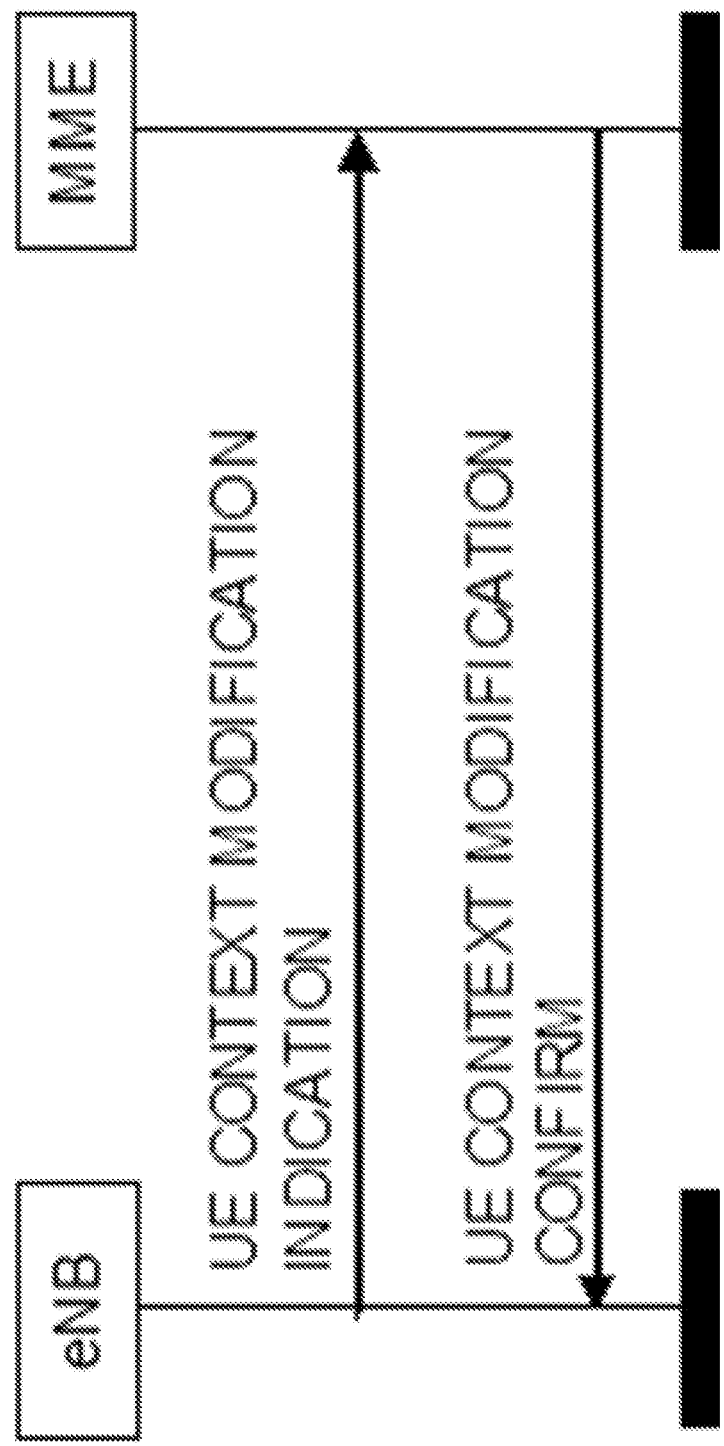
FIG. 7 is a signaling diagram illustrating a user equipment context modification indication, according to some embodiments.

FIG. 7 is a signaling diagram illustrating a user equipment context modification indication, according to some embodiments. In the illustrated procedure, the eNB indicates the information configured for reporting by the CN in the UE Context Modification Indication. The CN confirms the correct acceptance of such information in the UE Context Modification Confirm.

In additional embodiments, the information exchange between RAN and CN may be supported via procedures that transport NAS PDUs. For example, the request from the CN to subscribe to UE transitions between RRC CONNECTED and RRC CONNECTED INACTIVE may be provided via the DL NAS TRANSPORT procedure. This procedure may include potential parameters describing details of the subscription and optionally specific data (e.g., current location request) request.

The RAN may reply to this request via the UL NAS TRANSPORT or other procedures to transport NAS PDUs in uplink. This procedure may indicate whether the RAN accepted the subscription request and provides details related to the accepted subscription and data if requested (e.g., current location response). Alternatively, the procedure may only include the requested data if the events triggering data reporting have occurred.

The latter use of NAS transport procedures could be advantageous in cases when there is no UE context setup (e.g., cases when the user data are transmitted via CP channels and when a UE is transitioned between connected and connected inactive state).

A second group of embodiments include autonomous RAN initiated core network notification. According to certain embodiments, the core network notification procedure may be autonomous, initiated by the RAN without core network subscription.

Particular embodiments include standalone autonomous RAN initiated core network notification procedure, which may include a procedure on the CN/RAN interface. The RAN notifies the core network at any time it considers a UE becomes potentially subject to RRC CONNECTED INACTIVE state. An example is illustrated in FIG. 8.

Figure 8:
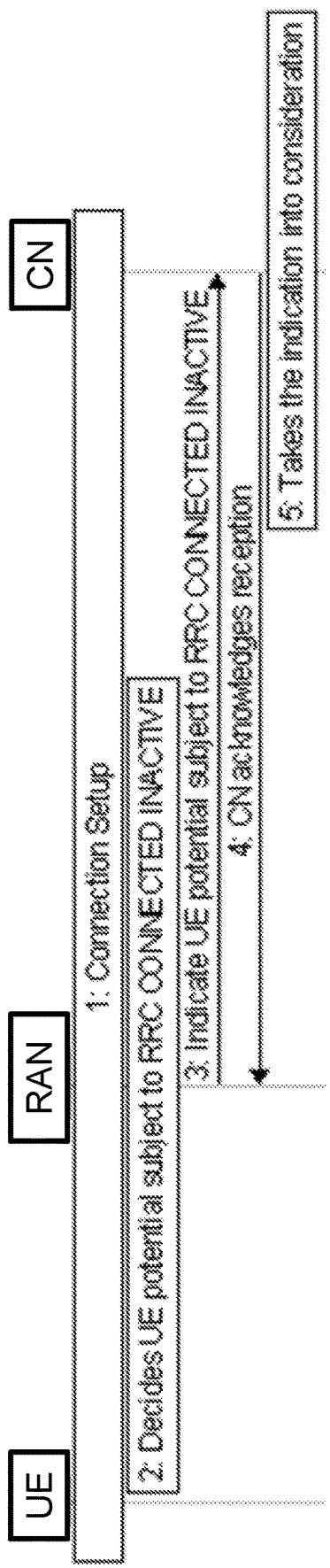
FIG. 8 is a sequence diagram illustrating an autonomous notification to the core network from the radio access network, according to some embodiments.

FIG. 8 is a sequence diagram illustrating an autonomous notification to the core network from the radio access network, according to some embodiments. At step 1, a UE is connected to the network and can receive and transfer user plane data and control plane data. At step 2, the RAN concludes that the UE could potentially be subject to RRC CONNECTED INACTIVE. This determination may be based on a variety of different factors, including but not limited to activity pattern.

At step 3, the RAN indicates to the core network that the UE may potentially, e.g. based on its activity pattern, be subject to RRC CONNECTED INACTIVE. At step 4, the CN acknowledges the reception of the notification from step 3. At step 5, the CN used the indication received from RAN in step 3, for example, when managing features that rely on knowledge about the UE location.

Another alternative of the above is to include the mechanism in the Connection Setup procedure, i.e. already in step 1 in FIG. 6. This is detailed below based on Initial UE Context Setup procedure in LTE. Particular embodiments include an embedded autonomous RAN initiated core network notification procedure. According to certain embodiments, the subscription procedure is embedded in the UE context setup procedure on the CN/RAN interface.

The new function is shown in relation to current standardized procedure. For example, the embodiment may be described in relation to the Connection Setup procedure described in Section 8.3.1 of 3GPP TS 36.413v13.3.0.

The purpose of the Initial Context Setup procedure is to establish the necessary overall initial UE Context including E-RAB context, the Security Key, Handover Restriction List, UE Radio capability and UE Security Capabilities etc. The procedure uses UE-associated signaling.

An example is illustrated in FIG. 6 (reproduced from FIG. 8.3.1.2-1 of 3GPP TS 36.413v13.3.0). In case of the establishment of an E-RAB the EPC must be prepared to receive user data before the INITIAL CONTEXT SETUP RESPONSE message has been received by the MME. If no UE-associated logical S1-connection exists, the UE-associated logical S1-connection shall be established at reception of the INITIAL CONTEXT SETUP REQUEST message.

The INITIAL CONTEXT SETUP REQUEST message shall contain within the E-RAB to be Setup List IE the information required by the eNB to build the new E-RAB configuration consisting of at least one additional E-RAB.

The E-RAB to be Setup Item IE may contain:
the NAS-PDU IE,
the Correlation ID IE in case of LIPA operation,
the SIPTO Correlation ID IE in case of SIPTO@LN operation,
the Bearer Type IE.

The INITIAL CONTEXT SETUP REQUEST message may contain
the Trace Activation IE.
the Handover Restriction List IE, which may contain roaming or access restrictions.
the UE Radio Capability IE.
the Subscriber Profile ID for RAT/Frequency priority IE.
the CS Fallback Indicator IE.
the SRVCC Operation Possible IE.
the CSG Membership Status IE.
the Registered LAI IE.
the GUMMEI IE, which indicates the MME serving the UE, and shall only be present according to subclauses 4.6.2 and 4.7.6.6 of TS 36.300.
the MME UE S1AP ID 2 IE, which indicates the MME UE S1AP ID assigned by the MME, and shall only be present according to subclause 4.6.2 of TS 36.300.
the Management Based MDT Allowed IE.
the Management Based MDT PLMN List IE.
the Additional CS Fallback Indicator IE.
the Masked IMEISV IE.
the Expected UE Behavior IE.
the ProSe Authorized IE.
the UE User Plane CIoT Support Indicator IE.
the RRC CONNECTED INACTIVE IE The INITIAL CONTEXT SETUP REQUEST message shall contain the Subscriber Profile ID for RAT/Frequency priority IE, if available in the MME.

If the Correlation ID IE is included in the INITIAL CONTEXT SETUP REQUEST message towards the eNB with L-GW function for LIPA operation, then the eNB shall use this information for LIPA operation for the concerned E-RAB.

If the SIPTO Correlation ID IE is included in the INITIAL CONTEXT SETUP REQUEST message towards the eNB with L-GW function for SIPTO@LN operation, then the eNB shall use this information for SIPTO@LN operation for the concerned E-RAB.

If the Bearer Type IE is included in the INITIAL CONTEXT SETUP REQUEST message and is set to "non IP", then the eNB shall not perform header compression for the concerned E-RAB.

If the Masked IMEISV IE is contained in the INITIAL CONTEXT SETUP REQUEST the target eNB shall, if supported, use it to determine the characteristics of the UE for subsequent handling.

If the Expected UE Behavior IE is included in the INITIAL CONTEXT SETUP REQUEST message, the eNB shall, if supported, store this information and may use it to determine the RRC connection time.

Upon receipt of the INITIAL CONTEXT SETUP REQUEST message the eNB shall
attempt to execute the requested E-RAB configuration.
store the UE Aggregate Maximum Bit Rate in the UE context, and use the received UE Aggregate Maximum Bit Rate for non-GBR Bearers for the concerned UE.
pass the value contained in the E-RAB ID IE and the NAS-PDU IE received for the E-RAB for each established Data radio bearer to the radio interface protocol.
The eNB shall not send the NAS PDUs associated to the failed Data radio bearers to the UE.
store the received Handover Restriction List in the UE context.
store the received UE Radio Capability in the UE context.
store the received Subscriber Profile ID for RAT/Frequency priority in the UE context and use it as defined in TS 36.300.
store the received SRVCC Operation Possible in the UE context and use it as defined in TS 23.216.
store the received UE Security Capabilities in the UE context.
store the received Security Key in the UE context, take it into use and associate it with the initial value of NCC as defined in TS 33.401.

store the received CSG Membership Status, if supported, in the UE context.

store the received Management Based MDT Allowed information, if supported, in the UE context.

store the received Management Based MDT PLMN List information, if supported, in the UE context.

store the received ProSe Authorization information, if supported, in the UE context.

For the Initial Context Setup an initial value for the Next Hop Chaining Count is stored in the UE context.

The allocation of resources according to the values of the Allocation and Retention Priority IE shall follow the principles described for the E-RAB Setup procedure.

The eNB shall use the information in the Handover Restriction List IE if present in the INITIAL CONTEXT SETUP REQUEST message to
- determine a target for subsequent mobility action for which the eNB provides information about the target of the mobility action towards the UE, except if the CS Fallback Indicator IE is set to "CS Fallback High Priority" and the Additional CS Fallback Indicator IE is not present in which case the eNB may use the information in the Handover Restriction List IE;
- select a proper SCG during dual connectivity operation.

If the Handover Restriction List IE is not contained in the INITIAL CONTEXT SETUP REQUEST message, the eNB shall consider that no roaming and no access restriction apply to the UE. The eNB shall also consider that no roaming and no access restriction apply to the UE when:
- one of the setup E-RABs has a particular ARP value (TS 23.401);
- the CS Fallback Indicator IE is set to "CS Fallback High Priority" and the Additional CS Fallback Indicator IE is not present and, in case the Handover Restriction List IE is applied, no suitable target is found, in which case it shall process according to TS 23.272.
- the CS Fallback Indicator IE is set to "CS Fallback High Priority" and the Additional CS Fallback Indicator IE is set to "no restriction", in which case it shall process according to TS 23.272.

If the Trace Activation IE is included in the INITIAL CONTEXT SETUP REQUEST message then eNB shall, if supported, initiate the requested trace function as described in TS 32.422. In particular, the eNB shall, if supported:
- if the Trace Activation IE does not include the MDT Configuration IE, initiate the requested trace session as described in TS 32.422;
- if the Trace Activation IE includes the MDT Activation IE, within the MDT Configuration IE, set to "Immediate MDT and Trace", initiate the requested trace session and MDT session as described in TS 32.422;
- if the Trace Activation IE includes the MDT Activation IE, within the MDT Configuration IE, set to "Immediate MDT Only", "Logged MDT only" or "Logged MBSFN MDT", initiate the requested MDT session as described in TS 32.422 and the eNB shall ignore Interfaces To Trace IE, and Trace Depth IE.
- if the Trace Activation IE includes the MDT Location Information IE, within the MDT Configuration IE, store this information and take it into account in the requested MDT session.
- if the Trace Activation IE includes the Signaling based MDT PLMN List IE, within the MDT Configuration IE, the eNB may use it to propagate the MDT Configuration as described in TS 37.320.
- if the Trace Activation IE includes the MBSFN-ResultToLog IE, within the MDT Configuration IE, take it into account for MDT Configuration as described in TS 37.320.
- if the Trace Activation IE includes the MBSFN-AreaId IE in the MBSFN-ResultToLog IE, within the MDT Configuration IE, take it into account for MDT Configuration as described in TS 37.320.

If the CS Fallback Indicator IE is included in the INITIAL CONTEXT SETUP REQUEST message, it indicates that the UE Context to be set-up is subject to CS Fallback.

The eNB shall reply with the INITIAL CONTEXT SETUP RESPONSE message and then act as defined in TS 23.272.

If the Registered LAI IE is included in the INITIAL CONTEXT SETUP REQUEST message, it indicates that the eNB may take the Registered LAI IE into account when selecting the target cell or frequency and then act as defined in TS 23.272.

If the UE Security Capabilities IE included in the INITIAL CONTEXT SETUP REQUEST message only contains the EIA0 algorithm as defined in TS 33.401 and if this EIA0 algorithm is defined in the configured list of allowed integrity protection algorithms in the eNB (TS 33.401), the eNB shall take it into use and ignore the keys received in the Security Key IE.

If the GUMMEI IE is contained in the INITIAL CONTEXT SETUP REQUEST message, the eNB shall, if supported, store this information in the UE context and use it for subsequent X2 handovers.

If the MME UE S1AP ID 2 IE is contained in the INITIAL CONTEXT SETUP REQUEST message, the eNB shall, if supported, store this information in the UE context and use it for subsequent X2 handovers.

If the Management Based MDT Allowed IE is contained in the INITIAL CONTEXT SETUP REQUEST message, the eNB shall use it, if supported, together with information in the Management Based MDT PLMN List IE, if available in the UE context, to allow subsequent selection of the UE for management based MDT defined in TS 32.422.

If the UE User Plane CIoT Support Indicator IE is included in the INITIAL CONTEXT SETUP REQUEST message and is set to "supported", the eNB shall, if supported, consider that User Plane CIoT EPS Optimization as specified in TS 23.401 is supported for the UE.

The eNB shall report to the MME, in the INITIAL CONTEXT SETUP RESPONSE message, the successful establishment of the security procedures with the UE, and, the result for all the requested E-RABs in the following way:
- A list of E-RABs which are successfully established shall be included in the E-RAB Setup List IE
- A list of E-RABs which failed to be established shall be included in the E-RAB Failed to Setup List IE.

When the eNB reports the unsuccessful establishment of an E-RAB, the cause value should be precise enough to enable the MME to know the reason for the unsuccessful establishment, e.g., "Radio resources not available", "Failure in the Radio Interface Procedure".

After sending the INITIAL CONTEXT SETUP RESPONSE message, the procedure is terminated in the eNB.

RAN can indicate to the CN that a UE might become subject to RRC CONNECTED INACTIVE.

Figure 9:
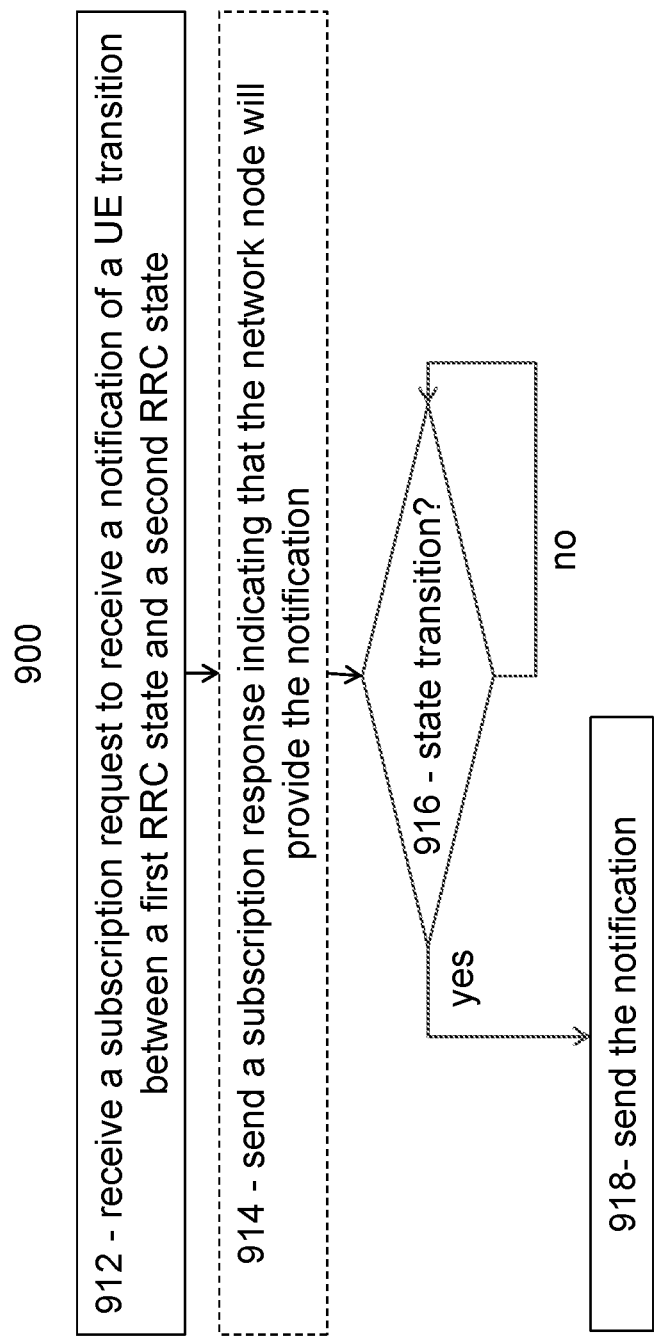
FIG. 9 is a flow diagram of an example method in a network node, according to some embodiments.

Particular embodiments performed in a network node may be generalized by FIG. 9. Particular embodiments performed in a core network node may be generalized by FIG. 10.

FIG. 9 is a flow diagram illustrating an example method in a network node, according to some embodiments. In particular embodiments, one or more steps of FIG. 9 may be performed by network node 120 of wireless network 100 described with respect to FIG. 4.

The method begins at step 912, where a network node receives a subscription request to receive a notification of a UE transition between a first RRC state and a second RRC state. For example, network node 120 may receive a subscription request from core network node 320 to be notified of a transition of wireless device 110 from a RRC CONNECTED STATE to an RRC CONNECTED INACTIVE state (or vice versa). The subscription request may include a request to receive location information of the UE. The subscription request may include a periodicity for receiving the notification. The periodicity specifies whether the notification is a one-time notification or a notification for each subsequent transition of the UE between the first RRC state and the second RRC state. In some embodiments, the request may include additional information. The network node may receive the subscription request according to any of the embodiments or examples described above with respect to FIGS. 6-8.

At step 914, the network node may optionally send a subscription response indicating that the network node will provide the notification. For example, network node 120 may provide a response to core network node 320 that network node 120 accepts the subscription and will provide all or some of the requested information to core network node 320. The network node may send a subscription response according to any of the embodiments or examples described above with respect to FIGS. 6-8. In some embodiments, network node 120 may not provide a confirmation at all, and the method may continue directly to step 916.

At step 916, the network node determines whether the UE transitioned between the first RRC state and the second RRC state. For example, network node 120 may determine that wireless device 110 transitioned, or is about to transition, from a RRC CONNECTED STATE to a RRC CONNECTED INACTIVE state (or vice versa). If the state transition occurred, the method continues to step 918.

At step 918, the network node sends the notification of the transition of the UE between the first RRC state and the second RRC state to the core network node. For example, network node 120 sends the notification to core network node 320. The notification may include information about the state change (e.g., from state and/or to state), location information, or any other suitable information.

In particular embodiments, the network node may send the notification in close temporal proximity to the occurrence of the state transition. In some embodiments, the network node may send the notification at scheduled intervals. The notification may comprise a one-time notification, or the notifications may continue for every state transition until the network node receives a cancel subscription request. The network node may send the notification according to any of the embodiments or examples described above with respect to FIGS. 6-8.

Modifications, additions, or omissions may be made to method 900 illustrated in FIG. 9. Additionally, one or more steps in method 900 may be performed in parallel or in any suitable order.

Figure 10:
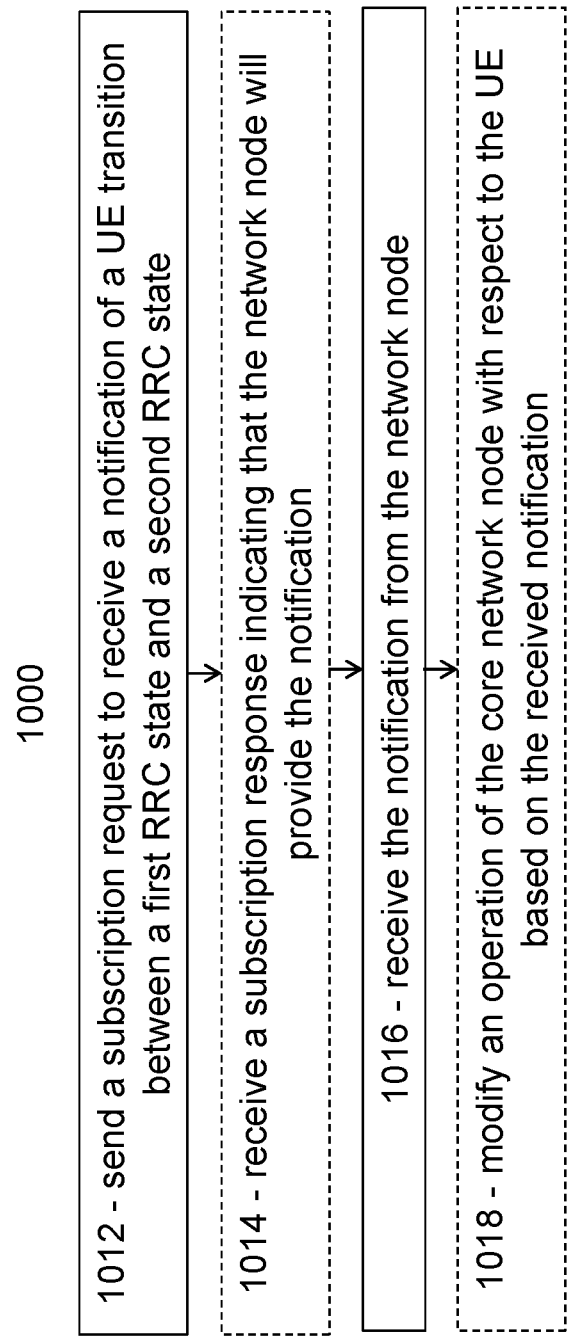
FIG. 10 is a flow diagram of an example method in a core network node, according to some embodiments.

FIG. 10 is a flow diagram illustrating an example method in a core network node, according to some embodiments. In particular embodiments, one or more steps of FIG. 10 may be performed by core network node 320 of wireless network 100 described with respect to FIG. 4.

The method begins at step 1012, where a core network node sends a subscription request to receive a notification of a UE transition between a first RRC state and a second RRC state. For example, core network node 320 may send a subscription request to network node 120 to be notified of a transition of wireless device 110 from a RRC CONNECTED STATE to an RRC CONNECTED INACTIVE state (or vice versa). The subscription request may include a request to receive location information of the UE. The subscription request may include a periodicity for receiving the notification. The periodicity specifies whether the notification is a one-time notification or a notification for each subsequent transition of the UE between the first RRC state and the second RRC state. In some embodiments, the request may include additional information. The core network node may send the subscription request according to any of the embodiments or examples described above with respect to FIGS. 6-8.

At step 1014, the core network node may optionally receive a subscription response indicating that the network node will provide the notification. For example, core network node 320 may receive a response from network node 120 that network node 120 accepts the subscription and will provide all or some of the requested information to core network node 320. The core network node may receive a subscription response according to any of the embodiments or examples described above with respect to FIGS. 6-8. In some embodiments, network node 120 may not provide a confirmation at all, and the method may continue directly to step 1016.

At step 1016, the core network node receives the notification from the network node. For example, upon network node 120 determining that wireless device 110 transitioned, or is about to transition, from a RRC CONNECTED STATE to a RRC CONNECTED INACTIVE state (or vice versa), core network node 120 may receive the notification from network node 120. The core network node may receive the notification according to any of the embodiments or examples described above with respect to FIGS. 6-8.

At step 1018, the core network node modifies an operation of the core network node with respect to the UE based on the received notification. For example, core network node 320 may perform an operation dependent on the location of wireless device 110. Core network node 320 may use location information received in the notification to perform the operation. Core network node 320 may modify an operation according to any of the embodiments or examples described above with respect to FIGS. 6-8.

Modifications, additions, or omissions may be made to method 1000 illustrated in FIG. 10. Additionally, one or more steps in method 1000 may be performed in parallel or in any suitable order.

Figure 11:
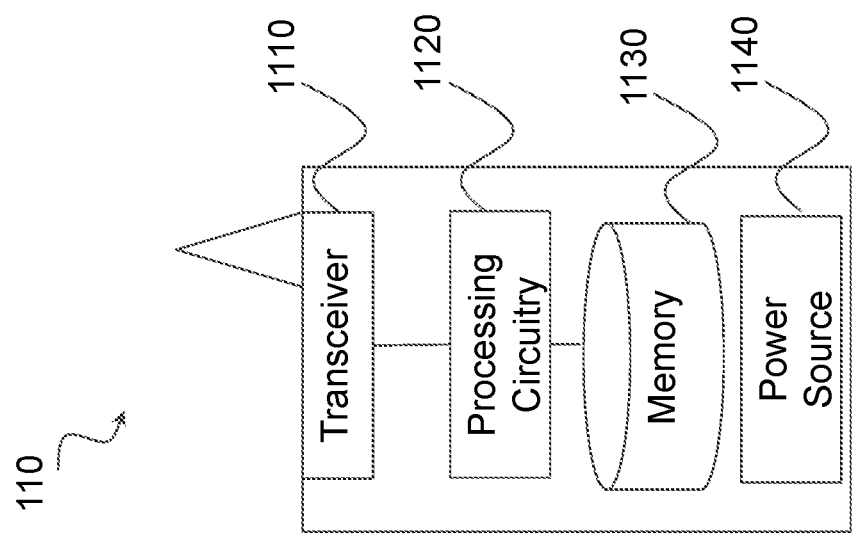
FIG. 11 is a block diagram illustrating an example embodiment of a wireless device.

FIG. 11 is a block diagram illustrating an example embodiment of a wireless device. The wireless device is an example of the wireless devices 110 illustrated in FIG. 4. In particular embodiments, the wireless device is capable of transitioning between RRC states.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1110, processing circuitry 1120, memory 1130, and power source 1140. In some embodiments, transceiver 1110 facilitates transmitting wireless signals to and receiving wireless signals from wireless network node 120 (e.g., via an antenna), processing circuitry 1120 executes instructions to provide some or all of the functionality described herein as provided by the wireless device, and memory 1130 stores the instructions executed by processing circuitry 1120. Power source 1140 supplies electrical power to one or more of the components of wireless device 110, such as transceiver 1110, processing circuitry 1120, and/or memory 1130.

Processing circuitry 1120 includes any suitable combination of hardware and software implemented in one or more integrated circuits or modules to execute instructions and manipulate data to perform some or all of the described functions of the wireless device. In some embodiments, processing circuitry 1120 may include, for example, one or more computers, one more programmable logic devices, one or more central processing units (CPUs), one or more microprocessors, one or more applications, and/or other logic, and/or any suitable combination of the preceding. Processing circuitry 1120 may include analog and/or digital circuitry configured to perform some or all of the described functions of wireless device 110. For example, processing circuitry 1120 may include resistors, capacitors, inductors, transistors, diodes, and/or any other suitable circuit components.

Memory 1130 is generally operable to store computer executable code and data. Examples of memory 1130 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1140 is generally operable to supply electrical power to the components of wireless device 110. Power source 1140 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 11) responsible for providing certain aspects of the wireless device's functionality, including any of the functionality described above and/or any additional functionality (including any functionality necessary to support the solution described above).

Figure 12B:
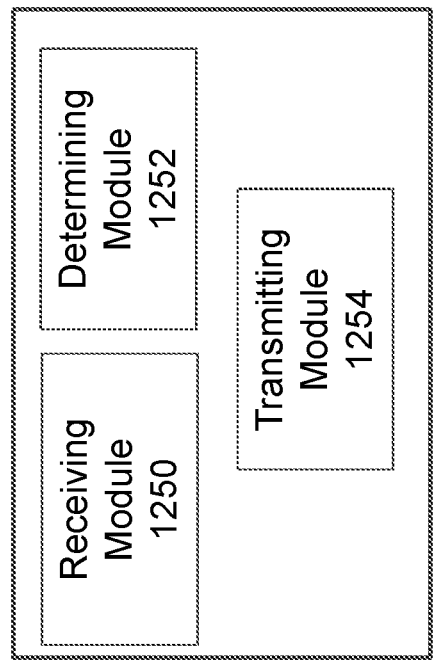
FIG. 12B is a block diagram illustrating example components of a network node.
Figure 12A:
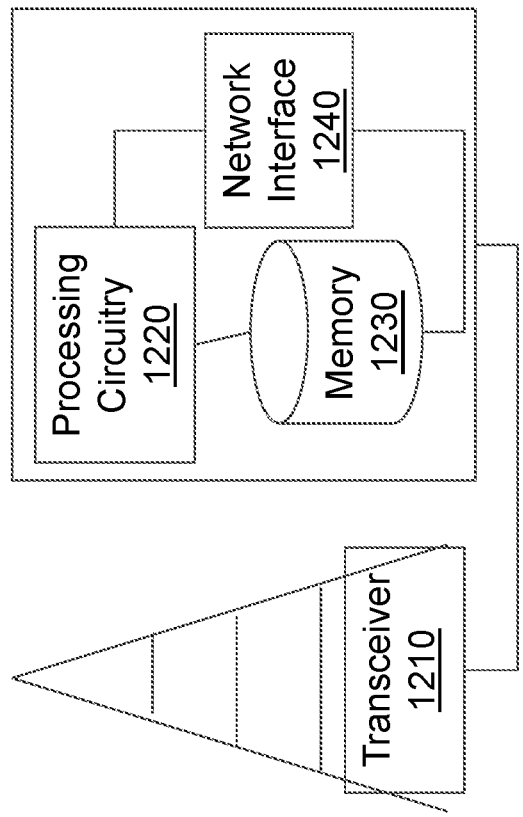
FIG. 12A is a block diagram illustrating an example embodiment of a network node.

FIG. 12A is a block diagram illustrating an example embodiment of a network node. The network node is an example of the network node 120 illustrated in FIG. 4. In particular embodiments, the network node is capable of receiving a request to receive a notification of a transition of a UE between a first RRC state and a second RRC state; determining the UE transitioned between the first RRC state and the second RRC state; and sending the notification of the transition of the UE between the first RRC state and the second RRC state to a core network node. The network node may send, to the core network node, a subscription response indicating that the network node will provide the notification.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1210, at least one processing circuitry 1220, at least one memory 1230, and at least one network interface 1240. Transceiver 1210 facilitates transmitting wireless signals to and receiving wireless signals from a wireless device, such as wireless devices 110 (e.g., via an antenna); processing circuitry 1220 executes instructions to provide some or all of the functionality described above as being provided by a network node 120; memory 1230 stores the instructions executed by processing circuitry 1220; and network interface 1240 communicates signals to backend network components, such as a gateway, switch, router, Internet, Public Switched Telephone Network (PSTN), controller, and/or other network nodes 120. Processing circuitry 1220 and memory 1230 can be of the same types as described with respect to processing circuitry 1320 and memory 1330 of FIG. 11 above.

In some embodiments, network interface 1240 is communicatively coupled to processing circuitry 1220 and refers to any suitable device operable to receive input for network node 120, send output from network node 120, perform suitable processing of the input or output or both, communicate to other devices, or any combination of the preceding. Network interface 1240 includes appropriate hardware (e.g., port, modem, network interface card, etc.) and software, including protocol conversion and data processing capabilities, to communicate through a network.

Other embodiments of network node 120 include additional components (beyond those shown in FIG. 12A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 12B is a block diagram illustrating example components of network node 120. The components may include receiving module 1250, determining module 1252, and transmitting module 1254.

Receiving module 1250 may perform the receiving functions of network node 120. For example, receiving module 1250 may receive, from a core network node, a request to receive a notification of a transition of the UE between a first RRC state and a second RRC state, as described in any of the embodiments or examples above. In certain embodiments, receiving module 1250 may include or be included in processing circuitry 1220. In particular embodiments, receiving module 1250 may communicate with determining module 1252 and transmitting module 1254.

Determining module 1252 may perform the determining functions of network node 120. For example, determining module 1252 may determine a UE transitioned between a first RRC state and a second RRC state according to any of the examples described above. In certain embodiments, determining module 1252 may include or be included in processing circuitry 1220. In particular embodiments, determining module 1252 may communicate with receiving module 1250 and transmitting module 1254.

Transmitting module 1254 may perform the transmitting functions of network node 120. For example, transmitting module 1254 may transmit a subscription response and/or a state transition notification to a core network node according to any of the examples described above. In certain embodiments, transmitting module 1254 may include or be included in processing circuitry 1220. In particular embodiments, transmitting module 1254 may communicate with receiving module 1250 and determining module 1252.

FIG. 13A is a block schematic of an example core network node 320, in accordance with certain embodiments. In particular embodiments, the core network node is capable of sending, to a network node, a subscription request to receive a notification of a transition of a UE between a first RRC state and a second RRC state; and upon the network node determining the UE transitioned between the first RRC state and the second RRC state, receiving the notification from the network node. The core network node may receive, from the network node, a subscription response indicating that the network node will provide the notification.

Examples of core network nodes can include a mobile switching center (MSC), a serving GPRS support node (SGSN), a mobility management entity (MME), a radio network controller (RNC), a base station controller (BSC), an access and mobility management function (AMF), and so on. The core network node includes processing circuitry 620, memory 630, and network interface 640. In some embodiments, processing circuitry 620 executes instructions to provide some or all of the functionality described above as being provided by the network node, memory 630 stores the instructions executed by processing circuitry 620, and network interface 640 communicates signals to any suitable node, such as a gateway, switch, router, Internet, Public Switched Telephone Network (PSTN), network nodes 120, radio network controllers or core network nodes 320, etc.

Processing circuitry 620 may include any suitable combination of hardware and software implemented in one or more modules to execute instructions and manipulate data to perform some or all of the described functions of the core network node. In some embodiments, processing circuitry 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 640 is communicatively coupled to processing circuitry 620 and may refer to any suitable device operable to receive input for the network node, send output from the network node, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of the network node may include additional components beyond those shown in FIG. 6 that may be responsible for providing certain aspects of the network node's functionality, including any of the functionality described above and/or any additional functionality (including any functionality necessary to support the solution described above).

FIG. 13B is a block diagram illustrating example components of core network node 320. The components may include receiving module 1350 and transmitting module 1352.

Receiving module 1350 may perform the receiving functions of core network node 320. For example, receiving module 1350 may receive, from a network node, a response to a notification subscription and/or a notification of a transition of a UE between a first RRC state and a second RRC state, as described in any of the embodiments or examples above. In certain embodiments, receiving module 1350 may include or be included in processing circuitry 620. In particular embodiments, receiving module 1350 may communicate with transmitting module 1352.

Transmitting module 1352 may perform the transmitting functions of core network node 320. For example, transmitting module 1352 may transmit a subscription request to a network node according to any of the examples described above. In certain embodiments, transmitting module 1352 may include or be included in processing circuitry 620. In particular embodiments, transmitting module 1352 may communicate with receiving module 1350.

Some embodiments of the disclosure may provide one or more technical advantages. Some embodiments may benefit from some, none, or all of these advantages. Other technical advantages may be readily ascertained by one of ordinary skill in the art. For example, some embodiments may advantageously enable the CN to subscribe to certain information available in RAN (e.g., the UE transition between RRC CONNECTED and RRC CONNECTED INACTIVE). The CN can use the information as input to its functions (e.g., based on the reliability of the knowledge about UE's location). As an example, the CN could adjust its behavior for UE location monitoring during periods of inactive connected state when the UE is not connected to the system at AS level and when it would not necessarily report a change of location (e.g., change of cell).

Although this disclosure has been described in terms of certain embodiments, alterations and permutations of the embodiments will be apparent to those skilled in the art. Although some embodiments have been described with reference to certain radio access technologies, any suitable radio access technology (RAT) or combination of radio access technologies may be used, such as long term evolution (LTE), LTE-Advanced, NR, UMTS, HSPA, GSM, cdma2000, WiMax, WiFi, etc. Accordingly, the above description of the embodiments does not constrain this disclosure. Other changes, substitutions, and alterations are possible without departing from the spirit and scope of this disclosure.

Abbreviations:
3GPP 3rd Generation Partnership Project
CA Carrier Aggregation
CC Component Carrier
eNB Evolved Node B
eNodeB Evolved Node B
FDD Frequency Division Duplex
LTE Long-Term Evolution
NR New Radio
PCC Primary Component Carrier
PCell Primary Cell
RAT Radio Access Technology
RRC Radio Resource Control
RSRP Reference Signal Received Power
RSRQ Reference Signal Received Quality
SCC Secondary Component Carrier
SCell Secondary Cell TDD Time Division Duplex
UE User Equipment
UMTS Universal Mobile Telecommunications System

The invention claimed is:

1. A method for use in a network node of providing a radio resource control (RRC) state of a user equipment (UE) to a core network node, the method comprising:
   receiving, from the core network node, a subscription request comprising a request to receive a notification of a transition of the UE between a first RRC state and a second RRC state;
   determining the UE transitioned between the first RRC state and the second RRC state;
   sending the notification of the transition of the UE between the first RRC state and the second RRC state to the core network node; and
   wherein the first RRC state is RRC CONNECTED and the second RRC state is RRC CONNECTED INACTIVE.

2. The method of claim 1, further comprising sending, to the core network node, a subscription response indicating that the network node will provide the notification.

3. The method of claim 1, wherein the subscription request includes a request to receive location information of the UE.

4. The method of claim 1, wherein the subscription request includes a periodicity for receiving the notification, wherein the periodicity specifies whether the notification is a one-time notification or a notification for each subsequent transition of the UE between the first RRC state and the second RRC state.

5. The method of claim 1, wherein the notification includes location information of the UE.

6. The method of claim 2, wherein the subscription request comprises an information element (IE) in a INITIAL CONTEXT SETUP REQUEST and the subscription response comprises an IF in a INITIAL CONTEXT SETUP RESPONSE.

7. A network node capable of providing a radio resource control (RRC) state of a user equipment (UE) to a core network node, the network node comprising processing circuitry operable to:
   receive, from the core network node, a subscription request comprising a request to receive a notification of a transition of the UE between a first RRC state and a second RRC state;
   determine the UE transitioned between the first RRC state and the second RRC state;
   send the notification of the transition of the UE between the first RRC state and the second RRC state to the core network node; and
   wherein the first RRC state is RRC CONNECTED and the second RRC state is RRC CONNECTED INACTIVE.

8. The network node of claim 7, the processing circuitry further operable to send, to the core network node, a subscription response indicating that the network node will provide the notification.

9. The network node of claim 7, wherein the subscription request includes a request to receive location information of the UE.

10. The network node of claim 7, wherein the subscription request includes a periodicity for receiving the notification, wherein the periodicity specifies whether the notification is a one-time notification or a notification for each subsequent transition of the UE between the first RRC state and the second RRC state.

11. The network node of claim 7, wherein the notification includes location information of the UE.

12. The network node of claim 8, wherein the subscription request comprises an information element (IE) in a INITIAL CONTEXT SETUP REQUEST and the subscription response comprises an IE in a INITIAL CONTEXT SETUP RESPONSE.

13. A method for use in a core network node of receiving radio resource control (RRC) state information of a user equipment (UE), the method comprising:
   sending, to a network node, a subscription request to receive a notification of a transition of the UE between a first RRC state and a second RRC state;
   upon the network node determining the UE transitioned between the first RRC state and the second RRC state, receiving the notification from the network node; and
   wherein the first RRC state is RRC CONNECTED and the second RRC state is RRC CONNECTED INACTIVE.

14. The method of claim 13, further comprising receiving, from the network node, a subscription response indicating that the network node will provide the notification.

15. The method of claim 13, wherein the subscription request includes a request to receive location information of the UE.

16. The method of claim 13, wherein the subscription request includes a periodicity for receiving the notification.

17. The method of claim 13, wherein the notification includes location information of the UE.

18. The method of claim 14, wherein the subscription request comprises an information element (IE) in a INITIAL CONTEXT SETUP REQUEST and the subscription response comprises an IF in a INITIAL CONTEXT SETUP RESPONSE.

19. The method of claim 13, further comprising modifying an operation of the core network node with respect to the UE based on the received notification.

20. A core network node capable of receiving radio resource control (RRC) state information of a user equipment (UE), the core network node comprising processing circuitry operable to:
   send, to a network node, a subscription request to receive a notification of a transition of the UE between a first RRC state and a second RRC state;
   upon the network node determining the UE transitioned between the first RRC state and the second RRC state, receive the notification from the network node; and
   wherein the first RRC state is RRC CONNECTED and the second RRC state is RRC CONNECTED INACTIVE.

21. The core network node of claim 20, the processing circuitry further operable to receive, from the network node, a subscription response indicating that the network node will provide the notification.

22. The core network node of claim 20, wherein the subscription request includes a request to receive location information of the UE.

23. The core network node of claim 20, wherein the subscription request includes a periodicity for receiving the notification.

24. The core network node of claim 20, wherein the notification includes location information of the UE.

25. The core network node of claim 21, wherein the subscription request comprises an information element (IE) in a INITIAL CONTEXT SETUP REQUEST and the subscription response comprises an IE in a INITIAL CONTEXT SETUP RESPONSE.

26. The core network node of claim 20, the processing circuitry further operable to modify an operation of the core network node with respect to the UE based on the received notification.

* * * * *

UNITED STATES PATENT AND TRADEMARK OFFICE
CERTIFICATE OF CORRECTION

| | | |
|---|---|---|
| PATENT NO. | : 10,880,948 B2 | Page 1 of 1 |
| APPLICATION NO. | : 16/338021 | |
| DATED | : December 29, 2020 | |
| INVENTOR(S) | : Centonza et al. | |

It is certified that error appears in the above-identified patent and that said Letters Patent is hereby corrected as shown below:

On the Title Page

Item (71), under "Applicant", in Column 1, Lines 1-2, delete "Telefonaktiebolagel LM Ericsson (publ)," and insert -- Telefonaktiebolaget LM Ericsson (Publ), --, therefor.

In the Specification

In Column 1, Line 7, delete "international" and insert -- International --, therefor.

In the Claims

In Column 31, Line 37, in Claim 6, delete "an IF" and insert -- an IE --, therefor.

In Column 32, Line 33, in Claim 18, delete "an IF" and insert -- an IE --, therefor.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*